(12) United States Patent
Abernethy

(10) Patent No.: US 11,087,395 B2
(45) Date of Patent: *Aug. 10, 2021

(54) SYSTEMS AND METHODS OF MOBILE BANKING RECONCILIATION

(71) Applicant: Xero Limited, Wellington (NZ)

(72) Inventor: Brock Stephen Abernethy, Wellington (NZ)

(73) Assignee: Xero Limited, Wellington (NZ)

( * ) Notice: Subject to any disclaimer, the term of this patent is extended or adjusted under 35 U.S.C. 154(b) by 108 days.

This patent is subject to a terminal disclaimer.

(21) Appl. No.: 16/282,089

(22) Filed: Feb. 21, 2019

(65) Prior Publication Data
US 2019/0236693 A1  Aug. 1, 2019

Related U.S. Application Data

(63) Continuation of application No. 14/705,265, filed on May 6, 2015, now Pat. No. 10,269,062.

(60) Provisional application No. 61/990,309, filed on May 8, 2014.

(51) Int. Cl.
*G06Q 40/02* (2012.01)
*G06Q 40/00* (2012.01)

(52) U.S. Cl.
CPC ............ *G06Q 40/02* (2013.01); *G06Q 40/12* (2013.12); *G06Q 40/128* (2013.12)

(58) Field of Classification Search
None
See application file for complete search history.

(56) References Cited

U.S. PATENT DOCUMENTS

| | | | |
|---|---|---|---|
| 7,925,551 | B2 | 4/2011 | Hahn-carlson et al. |
| 7,979,347 | B1 | 7/2011 | Greener et al. |
| 8,165,934 | B2 | 4/2012 | Manista et al. |
| 8,229,807 | B2 | 7/2012 | Elbizri |

(Continued)

FOREIGN PATENT DOCUMENTS

| | | |
|---|---|---|
| WO | WO-2013097024 A1 | 7/2013 |
| WO | WO-2015171840 A1 | 11/2015 |

OTHER PUBLICATIONS

"U.S. Appl. No. 14/705,265, Appeal Brief filed Aug. 22, 2016", 31 pgs.

(Continued)

*Primary Examiner* — Fateh M Obaid
(74) *Attorney, Agent, or Firm* — Schwegman Lundberg & Woessner, P.A.

(57) ABSTRACT

A mobile banking reconciliation application allows a user to reconcile a business's records with banking records associated with one or more accounts of the business. The mobile banking reconciliation application can access an accounting system to obtain business records and banking records associated with the business. The banking records and business records may be displayed as a set of cards that a user can scroll and/or flip through (e.g., using the touch screen of a mobile device). The related business records displayed may be a suggestion that is based on a determination that the banking record likely matches the business record. The user may identify the appropriate business record for the particular bank record being reconciled from existing business records, or the user may create a new business record.

17 Claims, 21 Drawing Sheets

(56) References Cited

U.S. PATENT DOCUMENTS

| | | | |
|---|---|---|---|
| 8,571,985 | B1 | 10/2013 | Grigg et al. |
| 8,694,393 | B2 | 4/2014 | Lobana et al. |
| 2003/0046229 | A1 | 3/2003 | Cresswell |
| 2003/0212617 | A1 | 11/2003 | Stone et al. |
| 2003/0225638 | A1* | 12/2003 | Secola .................. G06Q 40/12 705/30 |
| 2004/0108376 | A1* | 6/2004 | Witherspoon ......... G06Q 20/04 235/379 |
| 2005/0177507 | A1* | 8/2005 | Bandych .............. G06Q 20/102 705/40 |
| 2006/0186193 | A1* | 8/2006 | Nelson ................. G06Q 40/00 235/379 |
| 2007/0271160 | A1 | 11/2007 | Stone et al. |
| 2009/0043594 | A1 | 2/2009 | Tseng |
| 2009/0076935 | A1 | 3/2009 | Knowles et al. |
| 2010/0103124 | A1 | 4/2010 | Kruzeniski et al. |
| 2011/0137928 | A1 | 6/2011 | Engle et al. |
| 2011/0154188 | A1 | 6/2011 | Forstall et al. |
| 2011/0196795 | A1 | 8/2011 | Pointer |
| 2011/0295725 | A1 | 12/2011 | Gee et al. |
| 2012/0011462 | A1 | 1/2012 | Westerman et al. |
| 2012/0072953 | A1 | 3/2012 | James et al. |
| 2012/0123913 | A1 | 5/2012 | Sreesha |
| 2013/0085910 | A1 | 4/2013 | Chew |
| 2013/0179796 | A1 | 7/2013 | Bianrosa et al. |
| 2013/0179827 | A1 | 7/2013 | Eriksson et al. |
| 2013/0203468 | A1 | 8/2013 | Weng |
| 2013/0332210 | A1 | 12/2013 | Wyganowski et al. |
| 2014/0139454 | A1 | 5/2014 | Mistry et al. |
| 2014/0143738 | A1 | 5/2014 | Underwood, IV et al. |
| 2014/0282068 | A1 | 9/2014 | Levkovitz et al. |
| 2015/0186855 | A1 | 7/2015 | Bennett et al. |
| 2015/0324930 | A1* | 11/2015 | Abernethy ............. G06Q 40/02 705/30 |

OTHER PUBLICATIONS

"U.S. Appl. No. 14/705,265, Appeal Decision dated Sep. 26, 2018", 17 pgs.

"U.S. Appl. No. 14/705,265, Examiner's Answer dated Feb. 24, 2017", 14 pgs.

"U.S. Appl. No. 14/705,265, Examiner's Answer dated Mar. 15, 2017", 15 pgs.

"U.S. Appl. No. 14/705,265, Final Office Action dated Feb. 22, 2016", 11 pgs.

"U.S. Appl. No. 14/705,265, Non Final Office Action dated Aug. 31, 2015", 8 pgs.

"U.S. Appl. No. 14/705,265, Notice of Allowance dated Dec. 10, 2018", 5 pgs.

"U.S. Appl. No. 14/705,265, Response filed Apr. 24, 2017 to Examiner's Answer dated Feb. 24, 2017", 14 pgs.

"U.S. Appl. No. 14/705,265, Response filed Nov. 13, 2018 to Appeal Decision dated Sep. 26, 2018 and Final Office Action dated Feb. 22, 2016", 13 pgs.

"U.S. Appl. No. 14/705,265, Response filed Nov. 28, 2016 to Notification of Non-Compliant Appeal Brief dated Oct. 31, 2016", 6 pgs.

"U.S. Appl. No. 14/705,265, Response to Non Final Office Action dated Aug. 31, 2015", 11 pgs.

"Australian Application Serial No. 2015100617, Subsequent Examiners Report dated Dec. 14, 2015", 3 pgs.

"Australian Application Serial No. 2015255956, First Examination Report dated Nov. 7, 2017", 3 pgs.

"Australian Application Serial No. 2015255956, Response filed Mar. 7, 2018 to First Examination Report dated Nov. 7, 2017", 94 pgs.

"Australian Application Serial No. 2015255956, Response filed Aug. 9, 2018 to Subsequent Examiners Report dated May 2, 2018", 4 pgs.

"Australian Application Serial No. 2015255956, Subsequent Examiners Report dated May 2, 2018", 4 pgs.

"Australian Application Serial No. 2015255956, Subsequent Examiners Report dated Sep. 25, 2018", 4 pgs.

"Card Flip Animation", Telerik Forums—UI for Windows Phone Forum, http://www.telerik.com/forums/card-flip-animation, (Jul. 22, 2011), 2 pgs.

"European Application Serial No. 15 789 845.3, Response Filed Jul. 11, 2017 to Communication Pursuant to Rules 161 and 162 EPC", 11 pgs.

"European Application Serial No. 15789845.3, Extended European Search Report dated Oct. 2, 2017", 7 pgs.

"European Application Serial No. 15789845.3, Response filed Mar. 22, 2018 to Extended European Search Report dated Oct. 2, 2017", 20 pgs.

"International Application Serial No. PCT/US2015/029577, International Preliminary Report on Patentability dated Nov. 17, 2016", 8 pgs.

"International Application Serial No. PCT/US2015/029577, International Search Report dated Aug. 10, 2015", 2 pgs.

"International Application Serial No. PCT/US2015/029577, Written Opinion dated Aug. 10, 2015", 6 pgs.

"South African Application Serial No. 2016/08186, Voluntary Amendment filed Feb. 7, 2018", 9 pgs.

\* cited by examiner

SYSTEMS AND METHODS OF MOBILE BANKING RECONCILIATION

CROSS-REFERENCE TO RELATED APPLICATION

This patent application is a continuation of and claims the benefit of priority to U.S. patent application Ser. No. 14/705,265, filed May 6, 2015, which claims the benefit of U.S. Provisional Patent Application No. 61/990,309, filed May 8, 2014, entitled "SYSTEMS AND METHODS OF MOBILE BANKING RECONCILIATION," which is incorporated by reference herein in full.

TECHNICAL FIELD

The present disclosure generally relates to monetary transactions and, more specifically, to systems and methods for mobile banking reconciliation.

BACKGROUND

Accountants reconcile accounting records with bank statements by identifying each transaction reported on a bank statement and matching the transaction with a corresponding record in a ledger. Alternatively, the transaction can be used to create a new record in the ledger.

The reconciliation may be assisted by a computer application with a graphical user interface (GUI). The GUI may show bank records in a first list and ledger records in a second list.

BRIEF DESCRIPTION OF THE DRAWINGS

Some embodiments are illustrated by way of example and not of limitation in the figures of the accompanying drawings.

DETAILED DESCRIPTION

Figure 1:
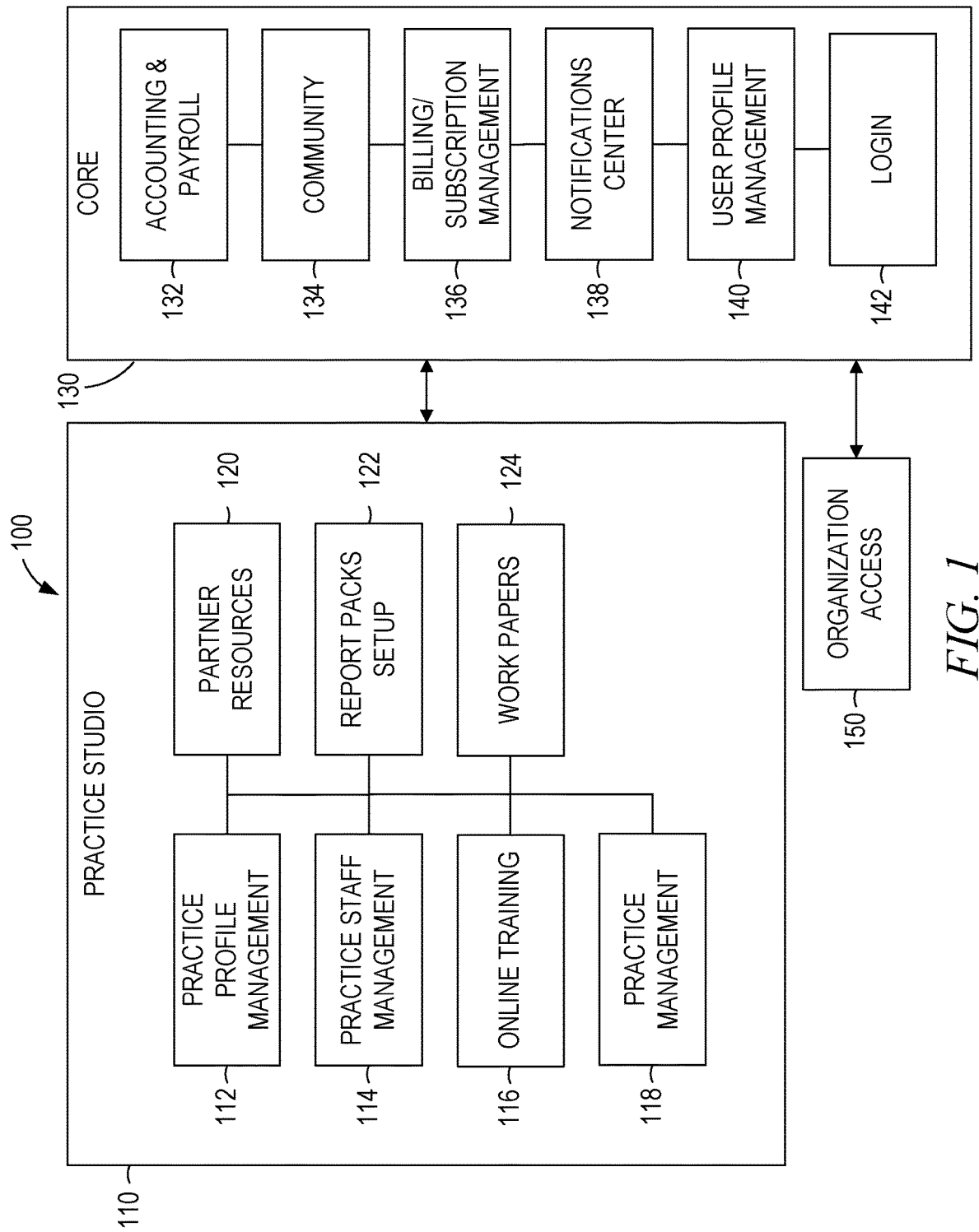
FIG. 1 is a block diagram depicting an example single ledger accounting platform, according to some embodiments.

Example systems and methods for mobile banking reconciliation are described. In the following description, for purposes of explanation, numerous specific details are set forth in order to provide a thorough understanding of example embodiments. It will be evident, however, to one skilled in the art that the present technology may be practiced without these specific details.

The technology described herein provides a mobile banking reconciliation application for a mobile device that allows a user to reconcile a business's records with banking records associated with one or more accounts of the business. The mobile banking reconciliation application may be associated with an accounting system that manages accounting aspects for a business. The mobile banking reconciliation application can access the accounting system (e.g., over a network) to obtain business records and banking records associated with the business.

A business record includes any records associated with a particular transaction performed by a business, such as an invoice or receivable record associated with an amount owed to the business by a payee, a bill or payable record associated with money spent by the business, and the like. A banking record may include any records associated with a financial institution, including a record indicating receipt of payment of a particular amount at an account of the financial institution, a record indicating a withdrawal from the account for a particular amount, and the like.

The banking records and business records may be displayed in any suitable manner. In some embodiments, the records are displayed as a set of cards that a user can scroll and/or flip through (e.g., using the touch screen of the mobile device).

Bank reconciliation is a process that explains the difference between the bank balance shown in a business's bank statement (e.g., as supplied by the bank) and the corresponding amount shown in the business's own accounting records at a particular point in time. Differences may arise because accounting records exist that do not have corresponding bank records. For example, an expense may have been recorded but not yet paid or an invoice may have been sent but payment on the invoice not yet received. Differences may also arise because bank records exist that do not have corresponding accounting records. For example, paying petty expenses using a company debit card creates a bank record immediately, but the business record for the expense is not created until the user or the accountant creates the record. As part of a business's operations, a business may reconcile a banking record with a business record to account for the transfer of funds by matching a particular business record with a corresponding bank record.

During the reconciliation process, a banking record may be displayed based on a user selection of the record or the bank account. One or more business records related to the banking record may be automatically displayed. The display of a related business record may be based on a determination that the banking record likely matches the business record. For example, a server may determine that the business record likely matches the banking record and send that information to a mobile application for presentation to a user. Alternatively, the match may be determined on the mobile device or by the user. For example, the user may search through business records and identify the appropriate business record for the particular bank record being reconciled, or the user may create a record to be used to reconcile the bank record. Additionally, the user may be able to add notes to a particular business record and/or banking record. Notes associated with records may be created independently of the identification of matching records.

As part of the bank reconciliation process, records can be combined and divided. For example, consider a bank record showing a payment of $1000 to a supplier. The $1000 payment was for multiple items purchased, each of which was entered as a separate item in the accounting ledger. To match the bank record with the accounting records, the $1000 bank record is split into multiple records, each of which corresponds to the one of the business records. Once the bank record is split, the split records can be matched to the business records.

FIG. 1 is a block diagram depicting an example single ledger accounting system 100. A single ledger accounting system 100 may provide accounting tools to a particular entity managing accounting for one or more businesses. The example single ledger accounting system 100 may include a practice studio 110 that allows an entity to manage one or more businesses and an organization access module 150 that provides a business with tools for managing accounting data for that particular business. The practice studio 110 may include a practice profile management module 112, a practice staff management module 114, an online training module 116, a practice management module 118, a partner resources module 120, a report packs setup module 122, and a work papers module 124. The practice studio 110 may be in communication with the core features 130. The core features 130 may include an accounting and payroll module 132, a community module 134, a billing/subscription management module 136, a notifications center module 138, a user profile management module 140, and a login module 142. The organization access module 150 may be in communication with the core features 130. The practice studio 110 and core features may be accessed by an entity using login module 142.

As shown in FIG. 1, features of the system are divided into three areas based on the target user. The features of the practice studio 110 provide a suite of tools for accountants to interact with their clients and manage their practices. The core features 130 provide the core functionality and user tools common to both accountants and businesses. The organization access module 150 provides a user interface for individual businesses to access their data.

Practice studio 110 is the central login for accountants. For example, an accountant with multiple clients, each of which is a small business, can login using practice studio 110 and gain access to the accounting data for the clients, messages from the clients, and so on.

The practice profile management module 112 allows an accounting practice to manage and view its profile settings. For example, an accounting practice may have a partner level, representing the strength of its relationship with the provider for the accounting platform. The partner level may be based on the number of clients associated with the accounting practice in the accounting platform. For example, a bronze partner level may be assigned to accounting practices with at least 5 clients, a silver partner level assigned to accounting practices with at least 20 clients, and a gold partner level assigned to accounting practices with at least 100 clients. Alternatively or additionally, the accounting practice may have one or more certifications provided by the accounting platform. The certifications may be provided automatically based on the completion of an online test and may expire after the elapse of a predetermined period (e.g., one year). Other profile settings may include the name, address, telephone number, email address, and so forth of the accounting practice.

The practice staff management module 114 provides the ability for the manager of an accounting practice to control settings for the staff of the practice. For example, some staff members may have read-only access to data for certain clients, some staff members may have read-write access for certain clients, some staff members may be able to modify the access permissions for other staff members, and so on.

The online training module 116 provides training for accountants and their staff. In some cases, the provided training includes one or more video presentations and one or more online tests. Notification of passing a test at completion of a training may be provided. For example, a staff member may take a training course and, upon successful completion, the accountant supervising the staff member may receive a notification of the successful completion.

The practice management module 118 provides services for accountants. Access to the features provided by the practice management module 118 may be limited to accountants having a predetermined partner level with the accounting platform provider. For example, access to the practice management module 118 may be limited to accountants at silver level or above. The services provided by the practice management module 118 may include workflow tools, customer relationship management (CRM) tools, lead generation tools, job management tools, invoice generation tools, and so forth.

The partner resources module 120 provides information regarding third-party partners. For example, a third party may provide tools that interact with the system to provide useful functionality beyond that of the system alone. The user can access the partner resources module 120 to learn about available third-party tools. For example, links to third-party websites, documentation, videos, and search tools may all be provided.

The report packs setup module 122 provides tools to allow accountants to create and generate standardized sets of reports. For example, a profit and loss statement and quarterly report could both be added to a pack. The accountant would then be able to easily generate both reports for any selected client or generate the reports for every client.

The work papers module 124 provides tools for accountants to interactively create financial reports. For example, an accountant can enter known data for a client into the work paper and then send the work paper to the client with an indication of data needed from the client. After the client enters the missing data into the work paper, the accountant can complete the report.

The core features 130 includes modules that are used both by accountants and organizations. The accounting and payroll module 132 provides the general ledger for organizations. The general ledger may be integrated with the organization's payroll, bypassing the separate step of entering payroll data into the general ledger each pay period. The accounting and payroll module 132 accesses banking data for each client business. The banking data may be imported either through a bank feed or a user- or accountant-created document. The accounting and payroll module 132 may also communicate with third-party tools via an application protocol interface (API).

The community module 134 provides a forum through which users can communicate. For example, a user with a question may post a topic in the forum and later receive a helpful response from another user. Information taken from the user profile (e.g., the user profile managed via the user profile management module 140) may appear along with forum posts by the user. For example, a user name, an image of the user, and the user's status as an accountant or member of an organization may each be shown.

The billing/subscription management module 136 allows a user to configure one or more billing accounts for each organization using the system. The system may periodically charge a subscription fee for access (e.g., a monthly or annual subscription fee). The subscription fee may be automatically deducted from the one or more billing accounts.

The notifications center 138 provides notifications to users. For example, users may send messages to each other, which appear as notifications. Notifications may also be created by the system (e.g., by accounting and payroll module 132) based on events. For example, a minimum account balance for a particular bank account may be set by a user via the accounting and payroll module 132. When the balance for that bank account drops below the minimum account balance, a notification can be generated by the system to inform the user.

The user profile management module 140 allows a user to manage the profile of the user's organization and the profiles of others based on permission settings. For example, an accountant may have permission to manage the profiles of the accountant's clients. The profile may include public-facing information such as a business name and address.

The login module 142 verifies the identify of a user logging into the system (e.g., via user name and password). Based on the user's identity, a user interface is presented that includes a list of organizations that a user has access to. For most small business clients, the list will consist of a single organization.

The organization access module 150 accesses the core features 130 for a single organization. The organization access module 150 presents, after user verification by the login module 142, a user interface with options for a single organization without the additional features used only by the practice studio 110.

Figure 2:
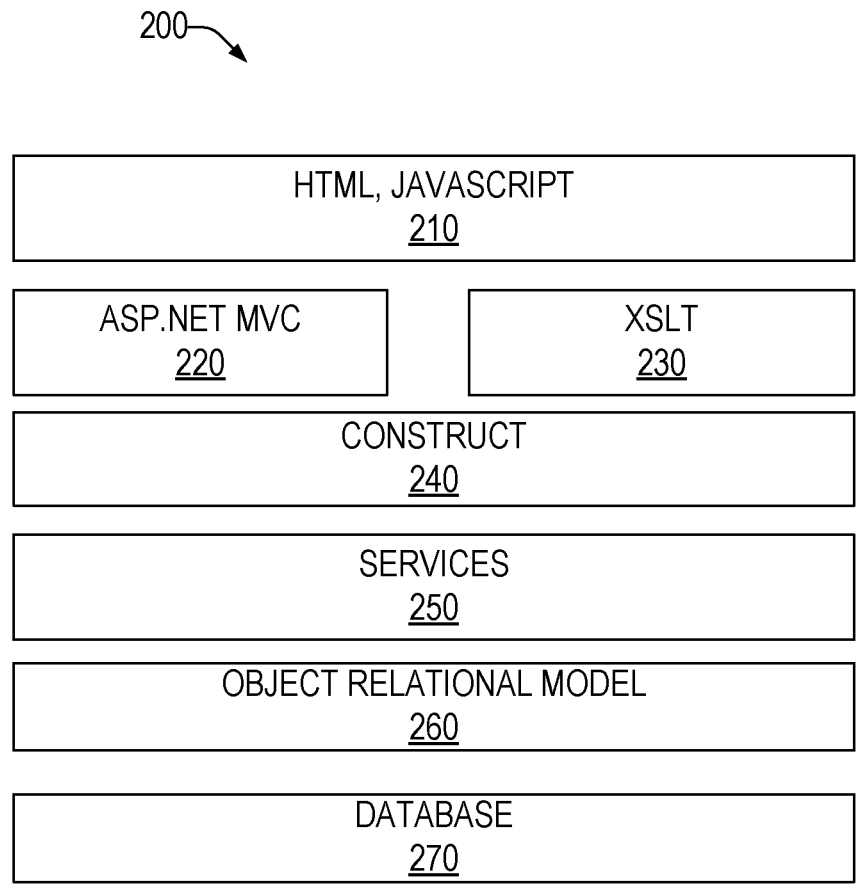
FIG. 2 is a block diagram depicting an example accounting application framework for the accounting platform, according to some embodiments.

FIG. 2 is a block diagram depicting an example accounting application framework 200 for the accounting platform. The accounting application framework 200 may be an end-to-end web development framework enabling a "software as a service" (SaaS) product. The accounting application framework 200 may include a hypertext markup language (HTML) and/or JavaScript layer 210, ASP.Net Model-View-Controller (MVC) 220, extensible stylesheet language transformations (XSLT) 230, construct 240, services 250, object relational module 260, and database 270.

The HTML and/or JavaScript layer 210 provides client-side functionality, such as UI generation, receipt of user input, and communication with a server. The client-side code may be created dynamically by the ASP.NET MVC 220 or the XSLT 230. Alternatively, the client-side code may be statically created or dynamically created using another server-side tool.

The ASP.Net MVC 220 and XSLT 230 provide server-side functionality, such as data processing, web page generation, and communication with a client. Other server-side technologies may also be used to interact with the database 270 and create an experience for the user.

The construct 240 provides a conduit through which data is processed and presented to a user. For example, the ASP.Net MVC 220 and XSLT 230 can access the construct 240 to determine the desired format of the data. Based on the construct 240, client-side code for presentation of the data is generated. The generated client-side code and data for presentation is sent to the client, which then presents the data.

The services 250 provide reusable tools that can be used by the ASP.Net 220, the XSLT 230, and the construct 240 to access data stored in the database 270. For example, aggregate data generated by calculations operating on raw data stored in the database 270 may be made accessible by the services 250.

The object relational model 260 provides data structures usable by software to manipulate data stored in the database 270. For example, the database 270 may represent a many-to-one relationship by storing multiple rows in a table, with each row having a value in common. By contrast, the software may prefer to access that data as an array, where the array is a member of an object corresponding to the common value. Accordingly, the object relational model 260 may convert the multiple rows to an array when the software accesses them and perform the reverse conversion when the data is stored.

Figure 3:
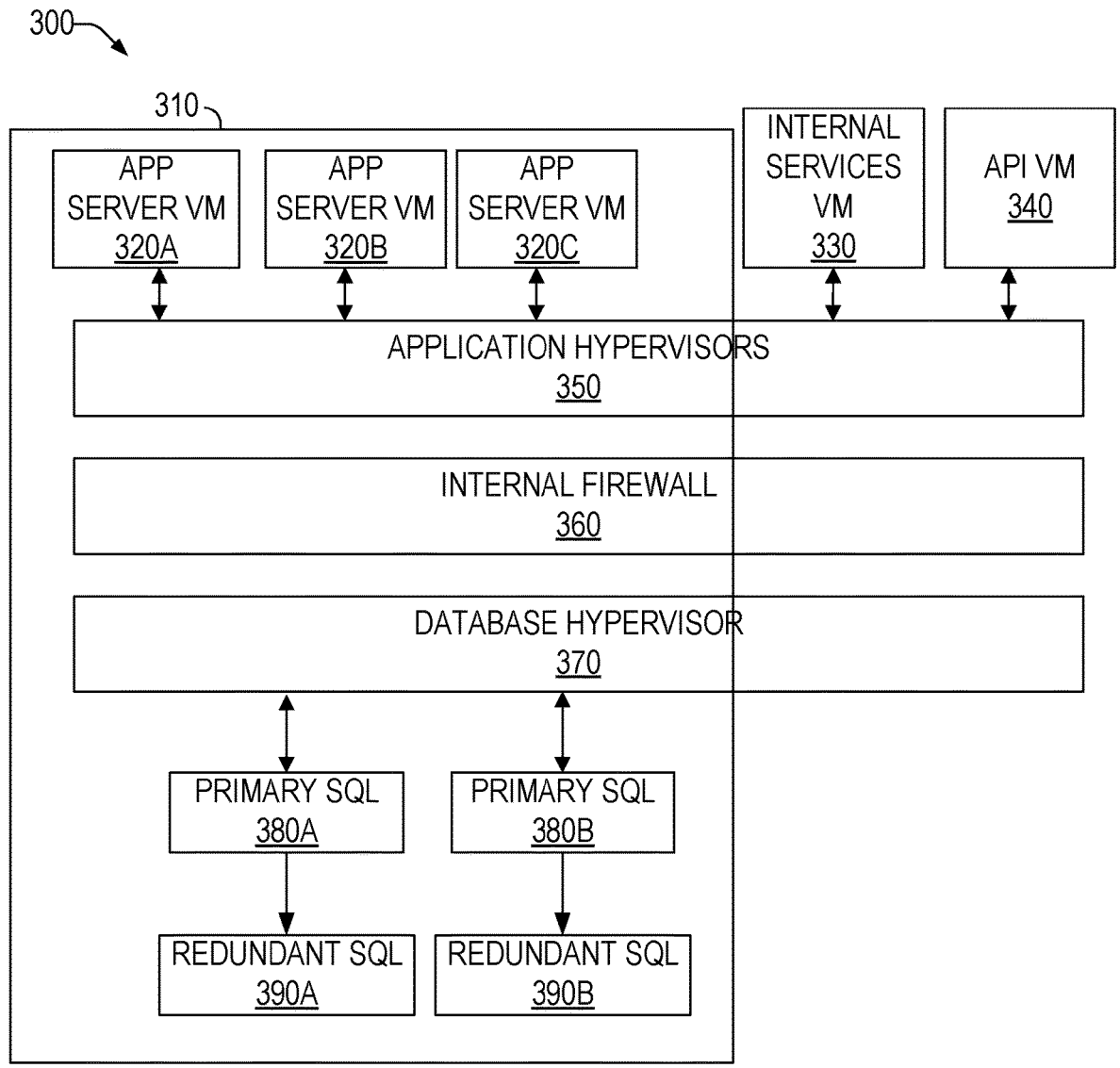
FIG. 3 is a block diagram depicting an example hosting infrastructure for the accounting platform, according to some embodiments.

FIG. 3 is a block diagram depicting an example hosting infrastructure 300 for the accounting platform. The platform may be implemented using one or more pods 310. Each pod 310 includes application server virtual machines (VMs) 320 (shown as application server virtual machines 320*a*-320*c* in FIG. 3) that are specific to the pod 310 as well as application server virtual machines that are shared between pods 310 (e.g., the internal services VM 330 and the application protocol interface VM 340). The application server virtual machines 320-340 communicate with clients and third-party applications via a web interface or an API. The application server virtual machines 320-340 are monitored by application hypervisors 350. In some example embodiments, the application server virtual machines 320*a*-320*c* and the API VM 340 are publicly-accessible while the internal services VM 330 is not accessible by machines outside of the hosting infrastructure 300. The app server VMs 320*a*-320*c* may provide end-user services via an application or web interface. The internal services VM 330 may provide back-end tools to the app server VMs 320*a*-320*c*, monitoring tools to the application hypervisors 350, or other internal services. The API VM 340 may provide a programmatic interface to third parties. Using the programmatic interface, the third parties can build additional tools that rely on the features provided by the pod 310.

The internal firewall 360 ensures that only approved communications are allowed between the database hypervisor 370 and the publicly-accessible virtual machines 320-340. The database hypervisor 370 monitors the primary SQL servers 380*a* and 380*b*. The primary SQL servers 380*a* and 380*b* access the shared storage layer 450*a* or 450*b* (shown in FIG. 4) to read and write data generated by or used by the application server virtual machines 320-340. The redundant SQL servers 390*a* and 390*b* provide backup functionality for the primary SQL servers 380*a* and 380*b*, respectively.

The virtual machines 320-340 can be implemented using Windows 2008 R2, Windows 2012, or another operating system. The application and support servers supporting the virtual machines 320-340 can be built using spares for redundancy. The support servers can be shared across multiple pods 310. The application hypervisors 350, internal firewall 360, and database hypervisor 370 may span multiple pods 310 within a data center. In some example embodiments, each primary SQL server 380 and redundant SQL server 390 is configured to support 30,000-45,000 organizations. Accordingly, in embodiments using two such server pairs per pod 310, the pod capacity is 60,000-90,000 organizations. The redundant SQL servers 390 may take advantage of the "always on" resilience feature of SQL 2012.

Figure 4:
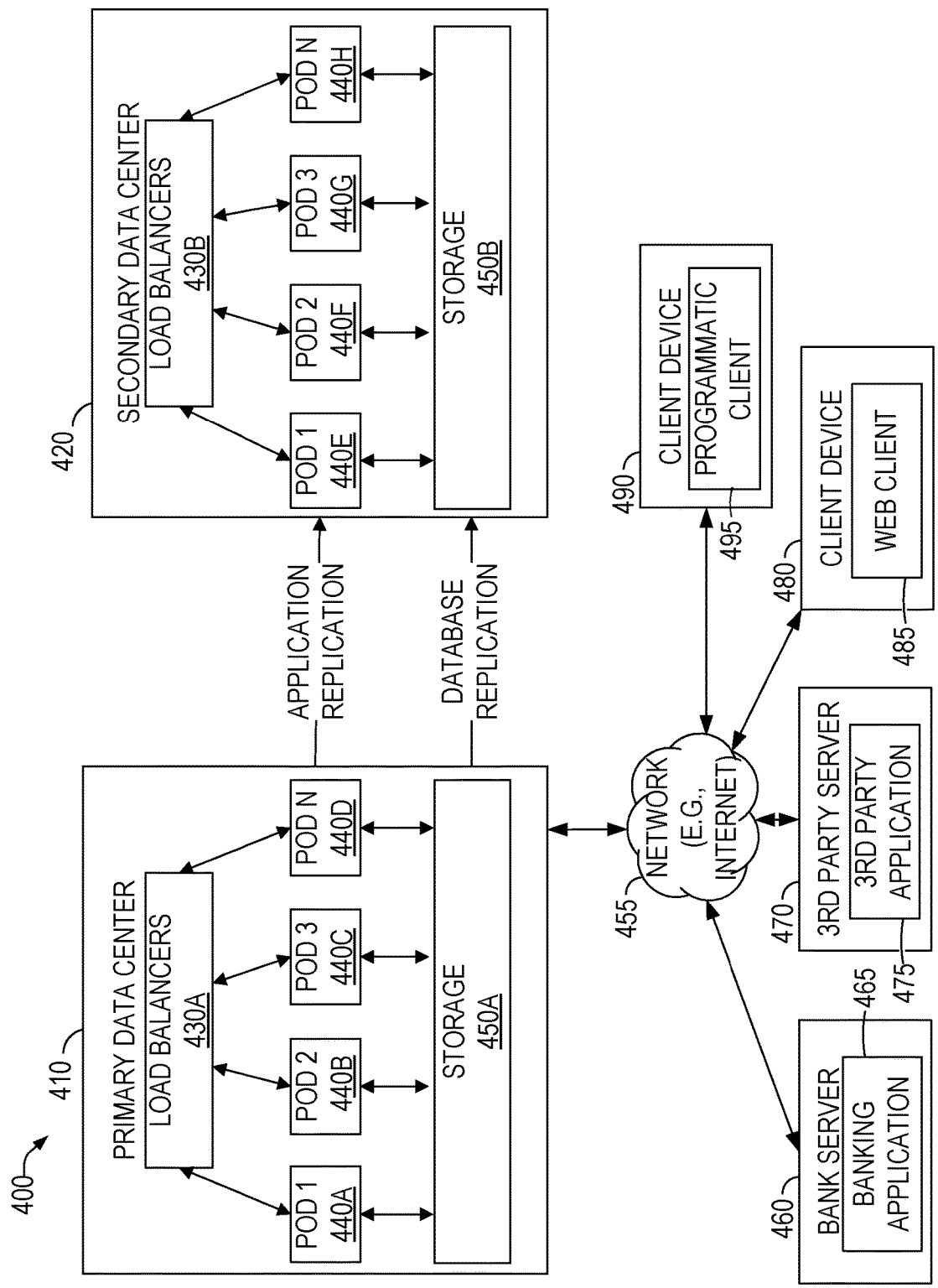
FIG. 4 is a block diagram depicting an example data center system of the accounting platform, according to some embodiments.

FIG. 4 is a block diagram depicting an example data center system 400 of the accounting platform interacting with other systems over a network. The primary data center 410 services customer requests and is replicated to the secondary data center 420. The secondary data center 420 may be brought online to serve customer requests in case of a fault in the primary data center 410. The primary data center 410 communicates over a network 455 with bank server 460, third party server 470, client device 480, and client device 490. The bank server 460 provides banking data (e.g., via the banking application 465). The third party server 470 is running third party application 475. Client devices 480 and 490 interact with the primary data center 410 using web client 485 and programmatic client 495, respectively.

Within each data center 410 and 420, a plurality of pods, such as the pod 310 of FIG. 3, are shown. The primary data center 410 is shown containing pods 440*a*-440*d*. The secondary data center 420 is shown containing pods 440*e*-440*h*. The applications running on the pods of the primary data center 410 are replicated to the pods of the secondary data center 420. For example, EMC replication (provided by EMC Corporation) in combination with VMWare site recovery manager (SRM) may be used for the application layer replication. The database layer handles replication between the storage layer 450*a* of the primary data center and the storage 450*b* of the secondary data center. Database replication provides database consistency and the ability to ensure that all databases are at the same point in time.

The data centers 410 and 420 use load balancers 430*a* and 430*b*, respectively, to balance the load on the pods within each data center. The data centers 410 and 420 can be created using identical hardware to ensure that the performance of the secondary data center 420 is the same as the performance of the primary data center 410. The storage 450 may be implemented using one or more EMC VNX storage area networks.

The bank server 460 interacts with the primary data center 410 to provide bank records for bank accounts of the client. For example, the client may provide account credentials to the primary data center 410, which the primary data center 410 uses to gain access to the account information of the client. The bank server 460 can provide the banking records to the primary data center 410 for later reconciliation by the client using the client device 480 or 490.

The third party server 470 may interact with the primary data center 410 and the client device 480 or 490 to provide additional features to a user of the client device 480 or 490. For example, a user may authorize the third party server 470 to access the user's data stored in the primary data center 410. The third party application 475 of the third party server 470 may use the user's data to generate reports, provide macros, or otherwise improve the user's ability to access or manipulate the user's data. The third party application 475 may communicate with the primary data center 410 via the network 455 using an API. The third party application 475 may communicate with the client device 480 or 490 using a web or programmatic interface.

Figure 5:
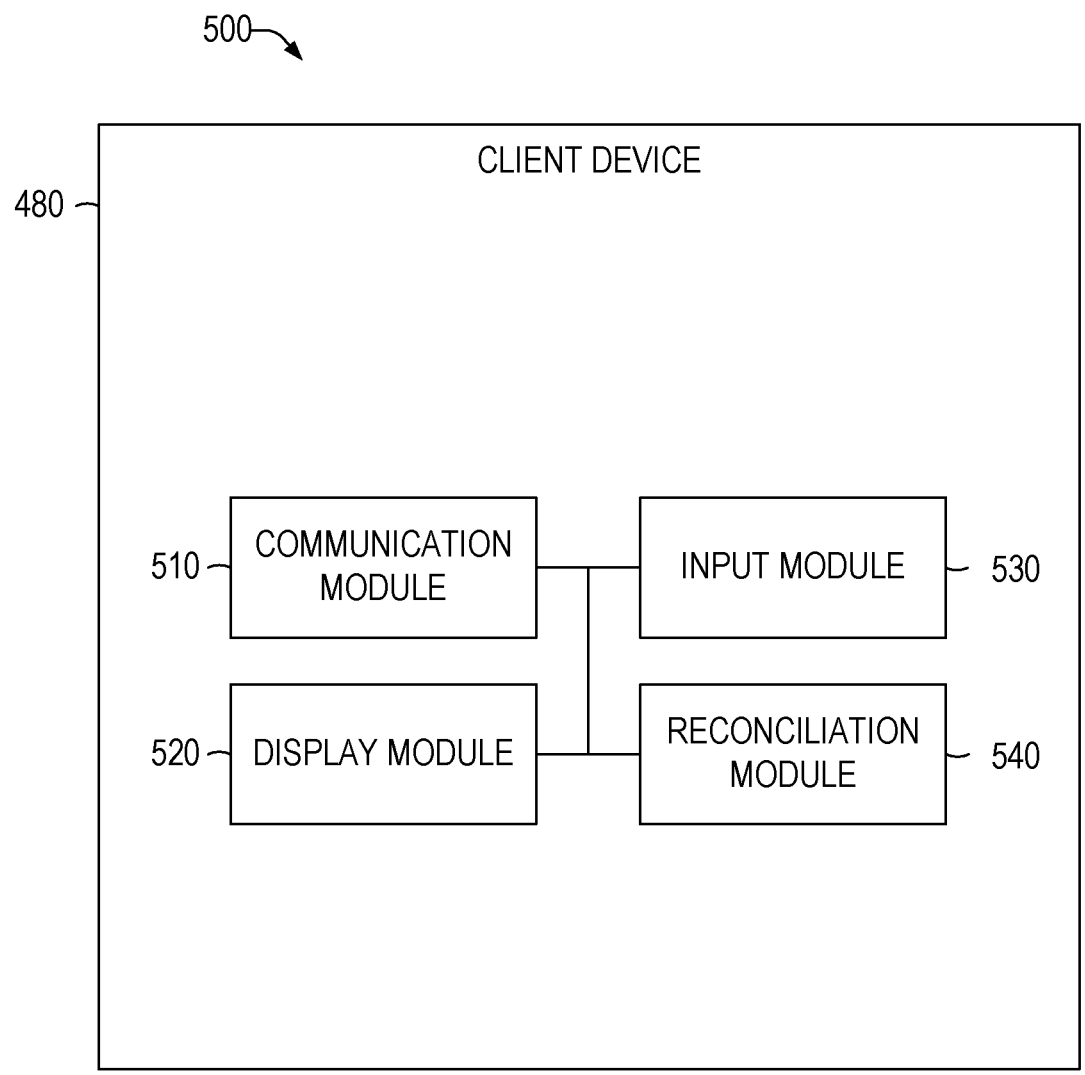
FIG. 5 is a block diagram depicting an example client device for accessing the accounting platform, according to some embodiments.

FIG. 5 is a block diagram 500 illustrating components of a client device suitable for mobile banking reconciliation, according to some example embodiments. The client device 480 or 490 is shown as including a communication module 510, a display module 520, an input module 530, and a reconciliation module 540, configured to communicate with each other (e.g., via a bus, shared memory, or a switch).

The communication module 510 may communicate with the primary data center 410, the third party server 470, the network 455, or any suitable combination thereof. Information received via the communication module 510 may be presented (e.g., displayed on a display device) via the display module 520. Information may be selected or search queries may be entered by a user of the client device 480 or 490.

A user interface is presented by the display module 520. The input from the user is detected by the input module 530. Commands received from the user by the input module 530 may be communicated to the primary data center 510 by the communication module 510. The communication module 510 may receive a response from the primary data center 410 that includes a set of banking records, a set of business records, associations between individual banking records and individual business records that indicate reconciliation between those records, and other data, in any combination.

The reconciliation module 540 can generate requests to the primary data center 410 to indicate that a banking record is reconciled by one or more business records. The request can be communicated to the primary data center 410 via the communication module 510 over the network 455.

Figure 6:
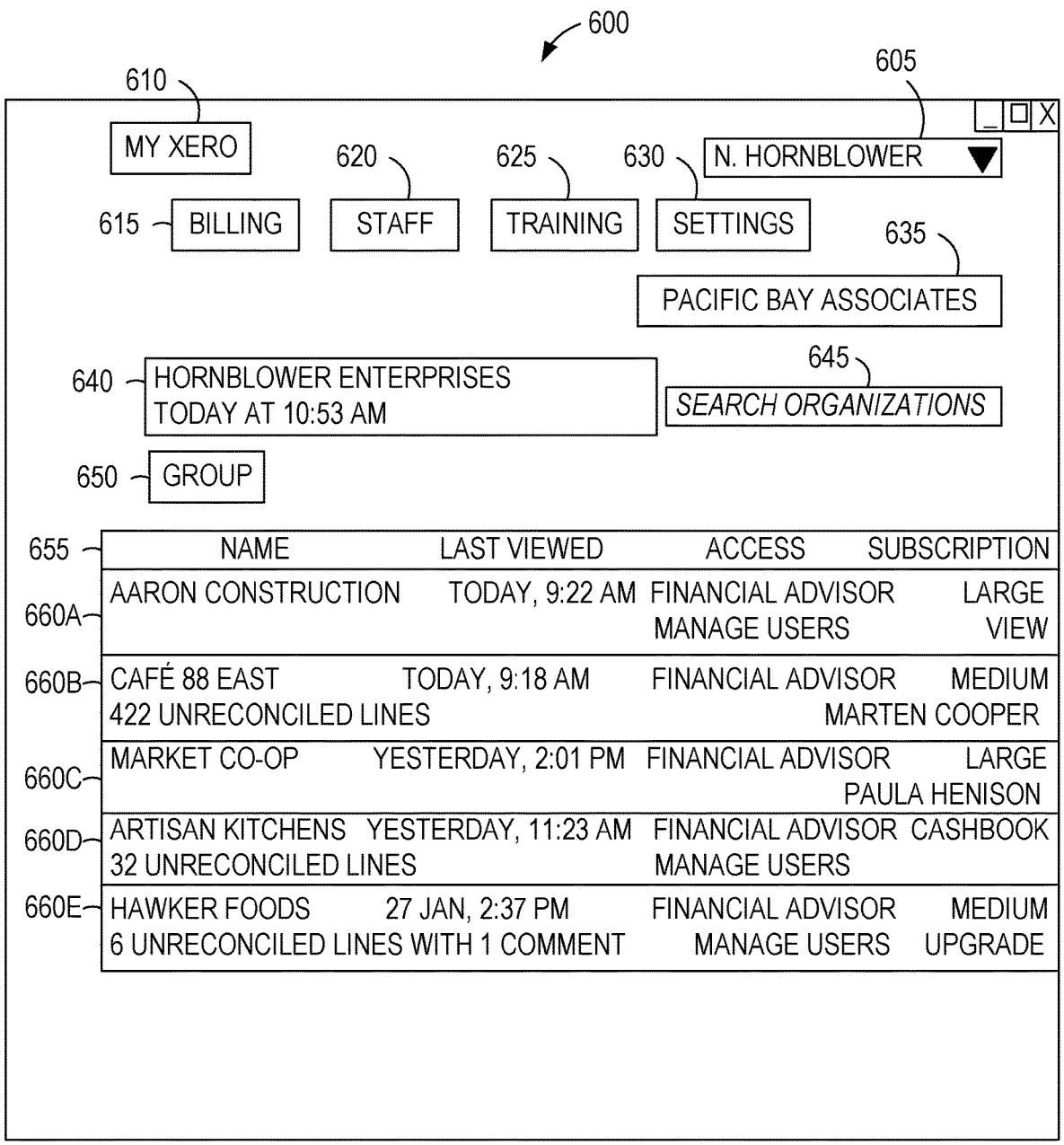
FIG. 6 is an interface diagram depicting an example user interface displaying accounts accessible by a user of the accounting platform, according to some embodiments.

FIG. 6 is an interface diagram depicting an example user interface 600 displaying accounts accessible by a user of the accounting platform. The elements 660*a*-660*e* are individual rows of data with information about different businesses and may be referred to collectively as elements 660. Similarly, an individual one of the elements 660 may be referred to as an element 660.

The element 605 shows the name of a logged-in user along with a downward-pointing arrow. The name or arrow may be operable to cause the display of a user profile menu. For example, the user may be able to change a contact email address, a password, and other individual information about the user.

The element 610 shows the name of the current application interface. In the example shown, the name is "My Xero." The element 610 may be used to distinguish between access by an organization (e.g., access via the organization access module 150) and access by an accounting practice (e.g., access via the practice studio 110). For example, the element 610 may be color-coded (e.g., blue for an organization and green for an accounting practice).

The elements 615-630 may be operable to cause the display of additional user interface options. For example, the element 615, labeled "Billing" may be operable to cause the display of a billing interface that allows the user to enter time-tracking information for use by the accounting and payroll module 132. The element 620, labeled "Staff," may be operable to bring up a staff interface that allows the user to control permissions for staff members. The functions of the staff interface may be implemented by the practice staff management module 114. For some users (e.g., for accountant users), the staff interface may allow the user to assign staff to particular jobs and may be implemented by the practice management module 118. The element 625, labeled "Training," may be operable to bring up a training interface that allows the user to schedule training sessions or review the results of training sessions. For example, the user may be enabled to set up a particular training session for a particular staff member. The element 630, labeled "Settings," may be operable to bring up a settings interface that allows the user to modify settings for the organization. For example, the organization may have a billing account on file that is used to pay for subscription access to the application. The settings interface can be used to add or change the billing account (e.g., using the billing/subscription management module 136).

The element 635 displays the name of the accountant for the organization. In some example embodiments, a logo for the accounting firm is also displayed.

The element 640 displays the currently selected organization and the last time data for the organization was updated.

The element 645 is a search box. The user may enter one or more search terms into the search box to cause the system to search for organizations matching the search terms.

The element 650, labeled "Group," allows the user to select multiple organizations and put them into a custom group. Operations may then be performed on the group. For example, a report pack may be run on every organization in a selected group.

The element 655 is a header for the elements 660 with information regarding organizations to which the user has access. The element 655 shows that each element 660 has a name, a date on which it was last viewed, an access permission, and subscription data. For example, the name of the organization for element 660a is Aaron Construction. The element 660a further shows that Aaron Construction was last viewed today at 9:22 AM. As shown in the element 660a, the current user is a financial advisor for Aaron Construction, and has the access privileges to manage users. Similarly, the element 660a shows that Aaron Construction has a "Large" subscription. The word "View" in the element 660a may be operable to view subscription information for Aaron Construction.

Additional information about the available organizations may be shown in the elements 660. For example, the elements 660b, 660d, and 660e each show a number of unreconciled lines. This may suggest to the user that further reconciliation of banking and business records is needed for the corresponding organizations: Cafe 88 East, Artisan Kitchens, and Hawker Foods.

The elements 660 show at least a subset of the accounts to which the user has access. For example, the accounts may be associated with one or more organizations for which the user manages a business. The user may click on a link associated with one of the businesses to access and manage accounting information associated with that business.

Figure 7:
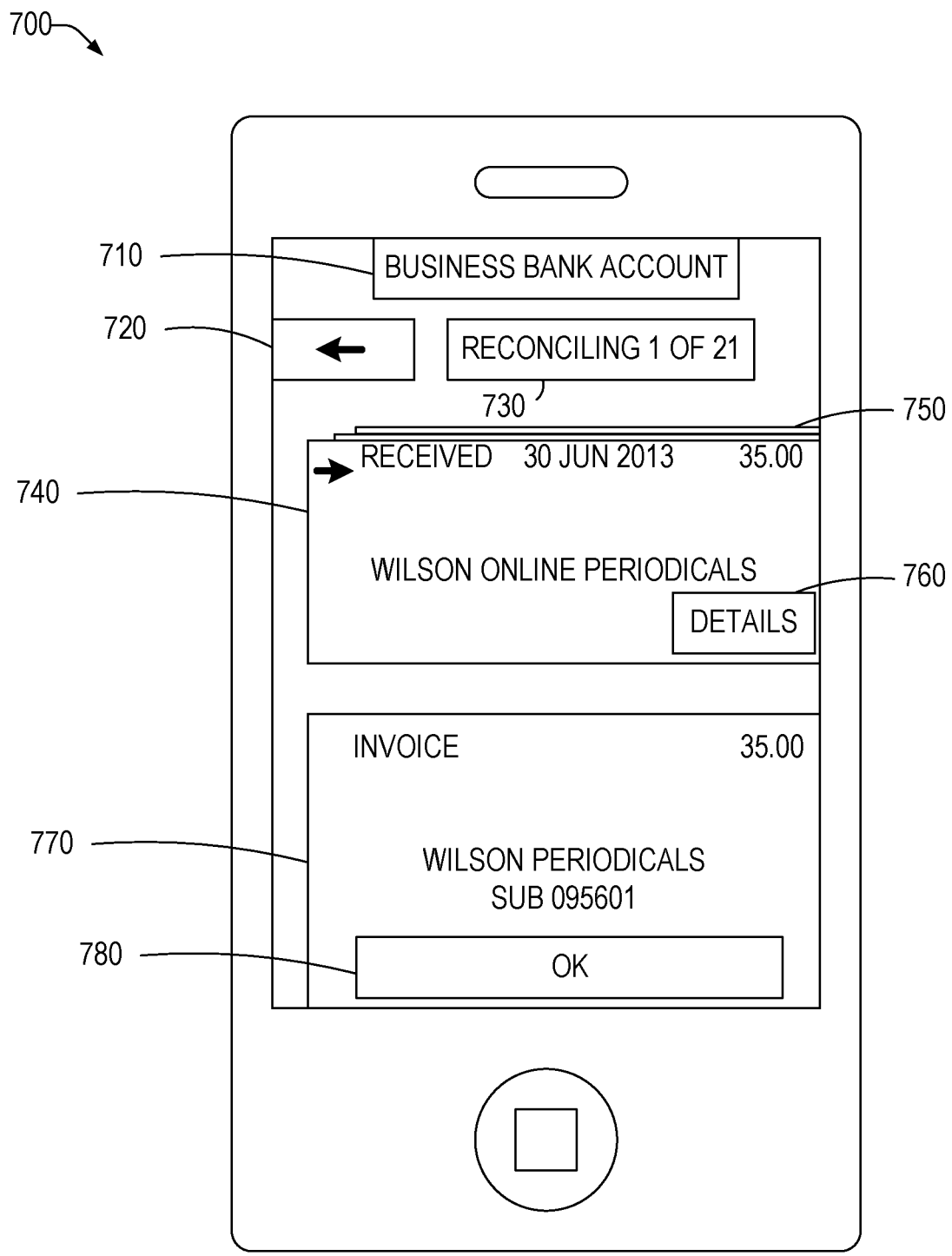
FIGS. 7-17 are interface diagrams depicting example user interfaces displaying features of a mobile banking reconciliation application, according to some embodiments.

FIG. 7 is an interface diagram depicting an example user interface 700 displaying features of a mobile banking reconciliation application. The example user interface 700 includes title 710, back button 720, status 730, objects 740 and 770, and additional object indicators 750. The objects 740 and 770 are both in the form of a card. The object 740 includes a button 760, labeled "Details." The object 770 includes a button 780, labeled "OK."

The title 710 shows that the user is currently reconciling the "Business Bank Account." The back button 720 is operable to return the user to a main screen of the mobile banking reconciliation application from the UI 700. The status 730 indicates that the banking record shown in the object 740 is the first record of 21 records to be reconciled.

The object 740 displays information associated with a banking record indicating a particular monetary amount (e.g., $35.00) received at a bank account associated with the business. The banking record also indicates the name of the other party to the transaction (e.g., Wilson Online Periodicals), the date of the transaction, and includes an arrow pointing to the right along with the word "received," each of which indicates that the $35.00 was added to the account.

Figure 8:
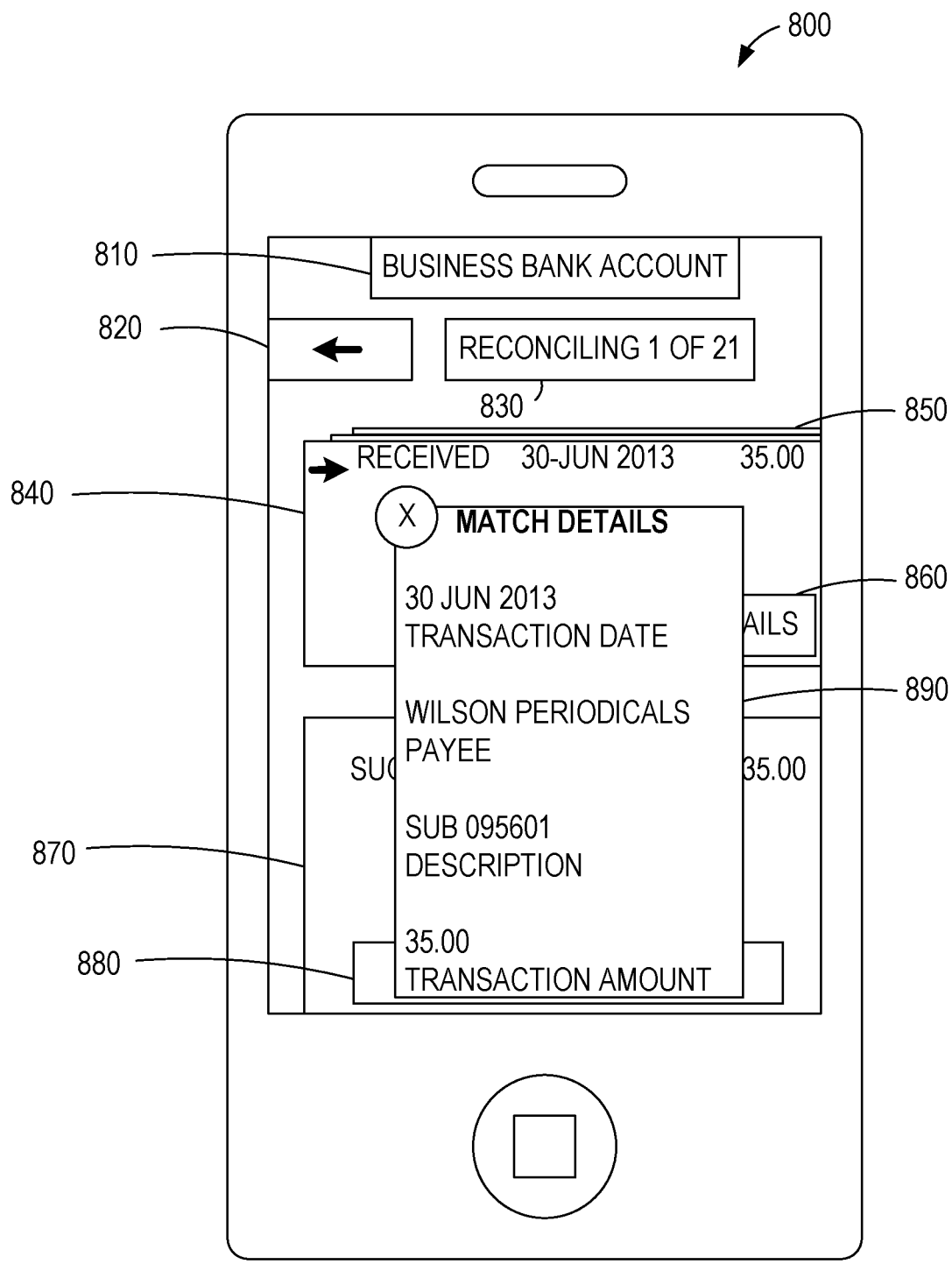

The button 760 may be operable to provide additional details for the transaction, for example via the pop-up window shown in FIG. 8.

The object 770 displays information associated with a business record indicating a particular monetary amount (e.g., $35.00) owed to the business by a particular organization (e.g., Wilson Periodicals). As shown in FIG. 7, the organization shown in object 770 is the same as the party to the transaction shown in object 740. The button 780 is operable to accept the match and reconcile the banking record with the business record. The button 780 may be color-coded to indicate that the business record was automatically suggested for reconciliation. For example, the button 780 may be green.

In some example embodiments, multiple proposed matches are generated. The user may swipe the screen left and right to move between the proposed matching business records. In some example embodiments, the user is enabled to create a new business record from the UI 700. For example, the user may swipe through the proposed matches until the end of the set of proposals is reached, and then swipe once more. By moving past the end of the set, the user may cause a new record to be presented. The new record may be pre-populated with data from the bank record shown on the object 740. For example, the name of the party and the amount for the business record may be copied from the object 740.

FIG. 8 is an interface diagram depicting an example user interface 800 displaying features of a mobile banking reconciliation application. The example user interface 800 includes title 810, back button 820, status 830, objects 840, 870, and 890, and additional object indicators 850. The objects 840 and 850 are both in the form of a card. The object 840 includes a button 860, labeled "Details." The object 870 includes a button 880, labeled "OK." The title 810, back button 820, status 830, objects 840 and 870, additional object indicators 850, and buttons 860 and 880 are similar to the title 710, back button 720, status 730, objects 740 and 770, additional object indicators 750, and buttons 760 and 780, respectively, as described above with respect to FIG. 7.

The object 890 shows details about the business record that matches the banking record shown in the object 840. As shown in FIG. 8, the business record details include the transaction date, the party to the transaction, a description of the transaction, and the amount of the transaction. The object 890 also includes an element marked with an "X," which may be operable to close or hide the object 890.

Figure 9:
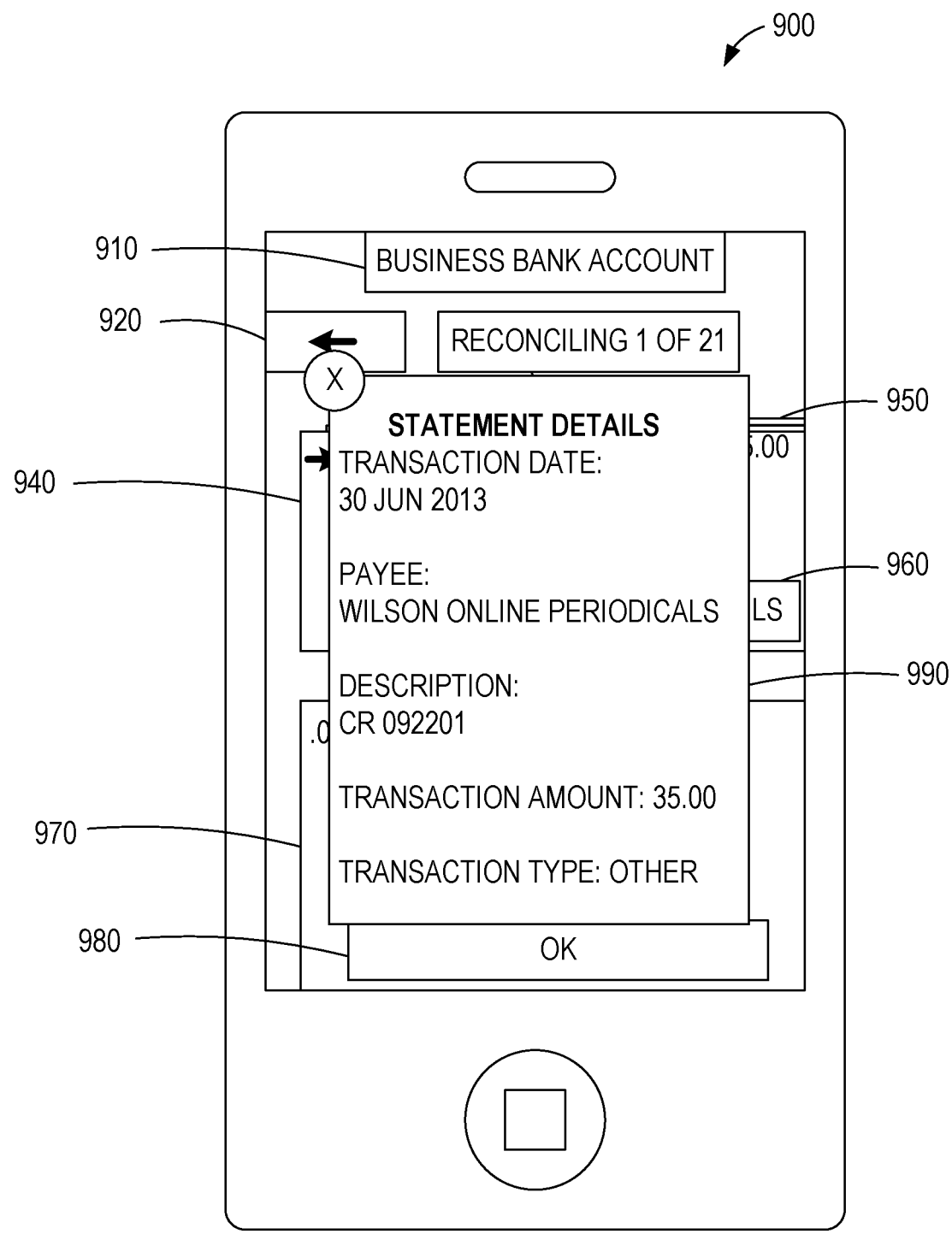

FIG. 9 is an interface diagram depicting an example user interface 900 displaying features of a mobile banking reconciliation application. The example user interface 900 includes title 910, back button 920, status 930, objects 940, 970, and 990, and additional object indicators 950. The objects 940 and 970 are both in the form of a card. The object 940 includes a button 960, labeled "Details." The object 970 includes a button 980, labeled "OK." The title 910, back button 920, status 930, objects 940 and 970, additional object indicators 950, and buttons 960 and 980 are similar to the title 710, back button 720, status 730, objects 740 and 770, additional object indicators 750, and buttons 760 and 780, respectively, as described above with respect to FIG. 7.

The object 990 shows details about the banking record being shown in the object 940. In some embodiments, the object 990 may be displayed when the user clicks or taps on the object displaying the banking record (e.g., object 740 of FIG. 7). As shown in FIG. 9, the banking record details include the transaction date, the party to the transaction, a description of the transaction, the amount of the transaction, and the type of the transaction. The object 990 also includes an element marked with an "X," which may be operable to close or hide the object 990.

Figure 10:
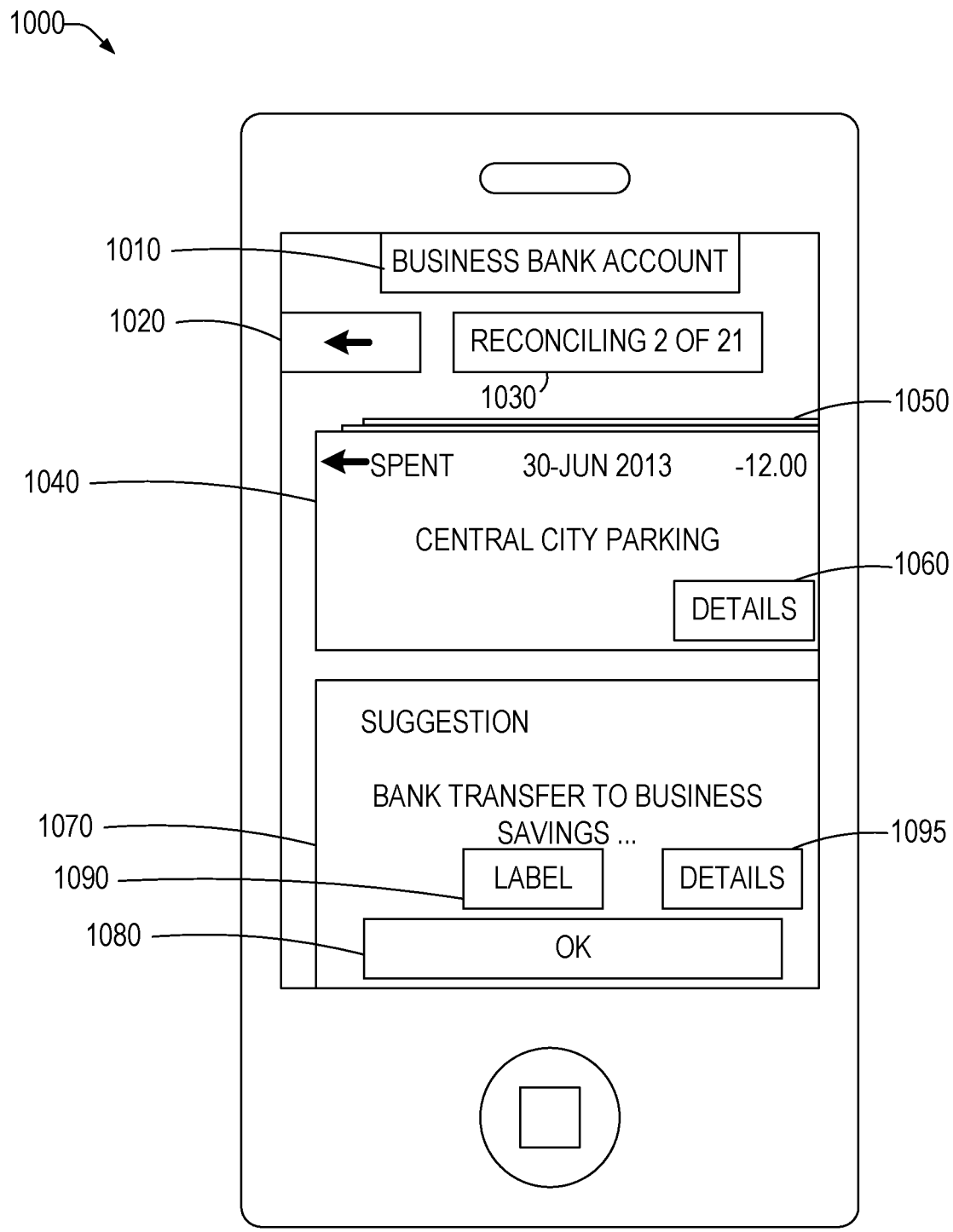

FIG. 10 is an interface diagram depicting an example user interface 1000 displaying features of a mobile banking reconciliation application. The example user interface 1000 includes title 1010, back button 1020, status 1030, objects 1040 and 1070, and additional object indicators 1050. The objects 1040 and 1070 are both in the form of a card. The object 1040 includes a button 1060, labeled "Details." The object 1070 includes a button 1080, labeled "OK," a button 1090, labeled "Label," and a button 1095, labeled "Details."

The title 1010 shows that the user is currently reconciling the "Business Bank Account." The back button 1020 is operable to return the user to a main screen of the mobile banking reconciliation application from the UI 1000. The status 1030 indicates that the banking record shown in the object 1040 is the second record of 21 records to be reconciled.

The object 1040 displays information associated with a banking record indicating a particular monetary amount (e.g., $12.00) deducted from a bank account associated with the business. The banking record also indicates the name of the other party to the transaction (e.g., Central City Parking), the date of the transaction, and includes an arrow pointing to the left along with the word "spent," each of which indicates that the $12.00 was subtracted from the account. The button 1060 may be operable to provide additional details for the transaction, for example via a pop-up window similar to the one shown in FIG. 8.

The object 1070 displays a suggested matching or new business record. As shown in FIG. 10, the suggested business record shown in the object 1070 is a transfer from the business bank account to the business savings account. The button 1080 is operable to accept the match and reconcile the banking record with the business record.

The button 1090 is operable to add a label or description to the business record. The button 1095 is operable to cause the display of details for the business record, for example via a pop-up window similar to the one shown in FIG. 8. Color coding may be used to distinguish between a suggested entry and a matching existing entry. For example, the button 1080 may be blue to indicate that the object 1070 is a suggested entry. By sliding to the right, the user may bring up a new blank entry, such as that shown in FIG. 14. Object 1070 displays information associated with a suggested business record that may be reconciled with the banking record. The mobile banking reconciliation application on the mobile device may (e.g., by accessing the accounting system over a network) access business records of the business and determine which business records would likely match the banking record. This may be performed by considering similarities in the characteristics of the records, such as by matching record dates, amounts, and the like, or any combination of such characteristics.

Figure 11:
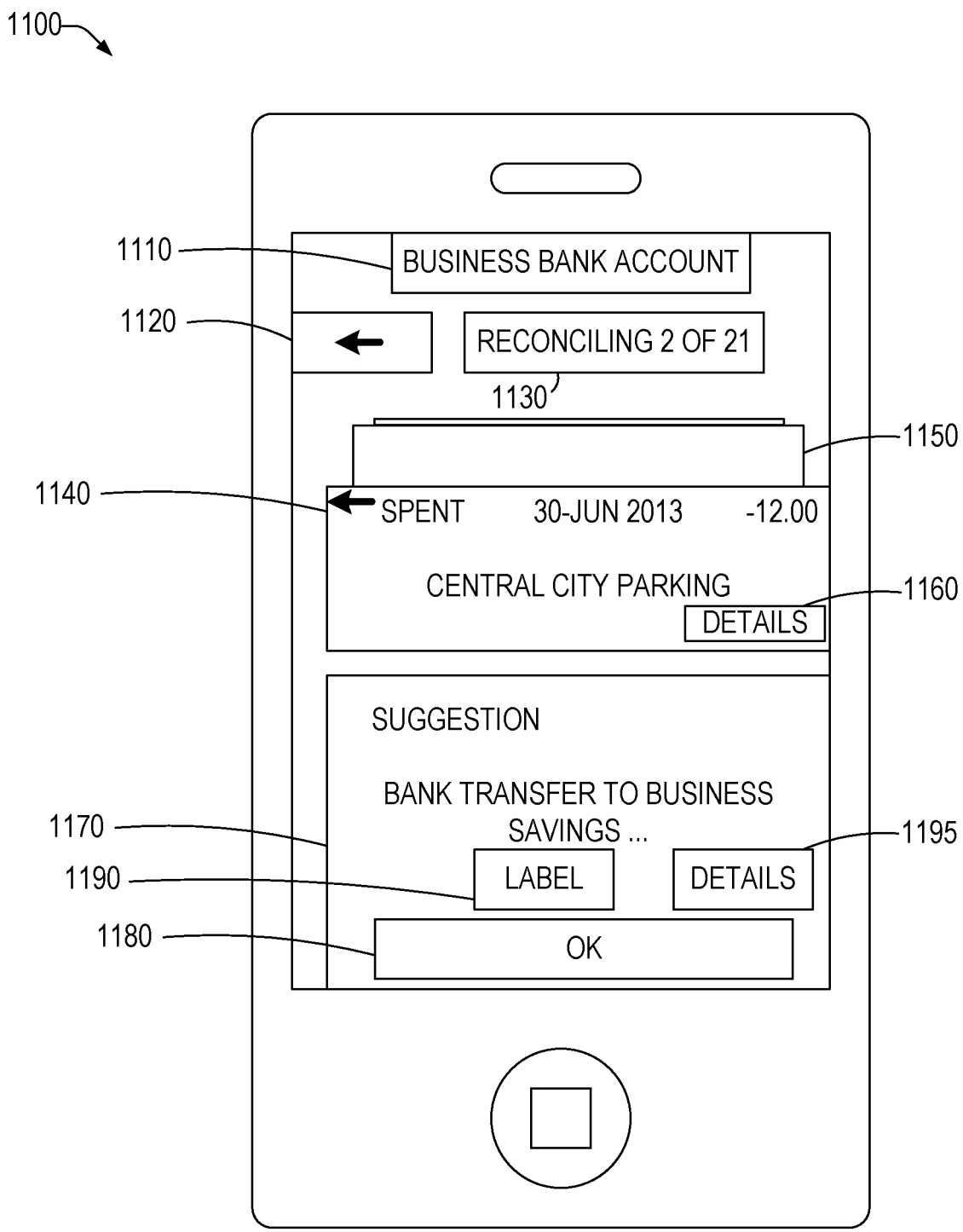

FIG. 11 is an interface diagram depicting an example user interface 1100 displaying features of a mobile banking reconciliation application. The example user interface 1100 includes title 1110, back button 1120, status 1130, objects 1140 and 1170, and additional object indicators 1150. The objects 1140 and 1170 are both in the form of a card. The object 1140 includes a button 1160, labeled "Details." The object 1170 includes a button 1180, labeled "OK," a button 1190, labeled "Label," and a button 1195, labeled "Details."

The title 1110 shows that the user is currently reconciling the "Business Bank Account." The back button 1120 is operable to return the user to a main screen of the mobile banking reconciliation application from the UI 1100. The status 1130 indicates that the banking record shown in the object 1140 is the second record of 21 records to be reconciled.

In FIG. 11, the example user interface 1100 displays an animation of cards being flipped through by a user. While the object 1140 is being flipped, the button 1160 may be inoperable. The flipping of the object 1140 may cause the next banking record to be displayed. On a touchscreen-enabled mobile device, the user may swipe the screen to cause the cards to flip. The speed or length of the swipe may influence the speed of the flipping, the number of cards that flip, or both. For example, a slow one-inch swipe may cause a single card to flip slowly, a fast one-inch swipe may cause two cards to flip quickly, a slow three-inch swipe may cause three cards to flip slowly, and a fast four-inch swipe may cause ten cards to flip quickly. The location of the start of the swipe may impact whether the cards representing business records or the cards representing banking records flip. For example, if the swipe starts on the object 1170, the records representing business records may flip. The direction of the swipe can be used to determine the direction of the flip. For example, swiping downward can cause a later record to be shown while swiping upward causes an earlier record to be shown.

Figure 12:
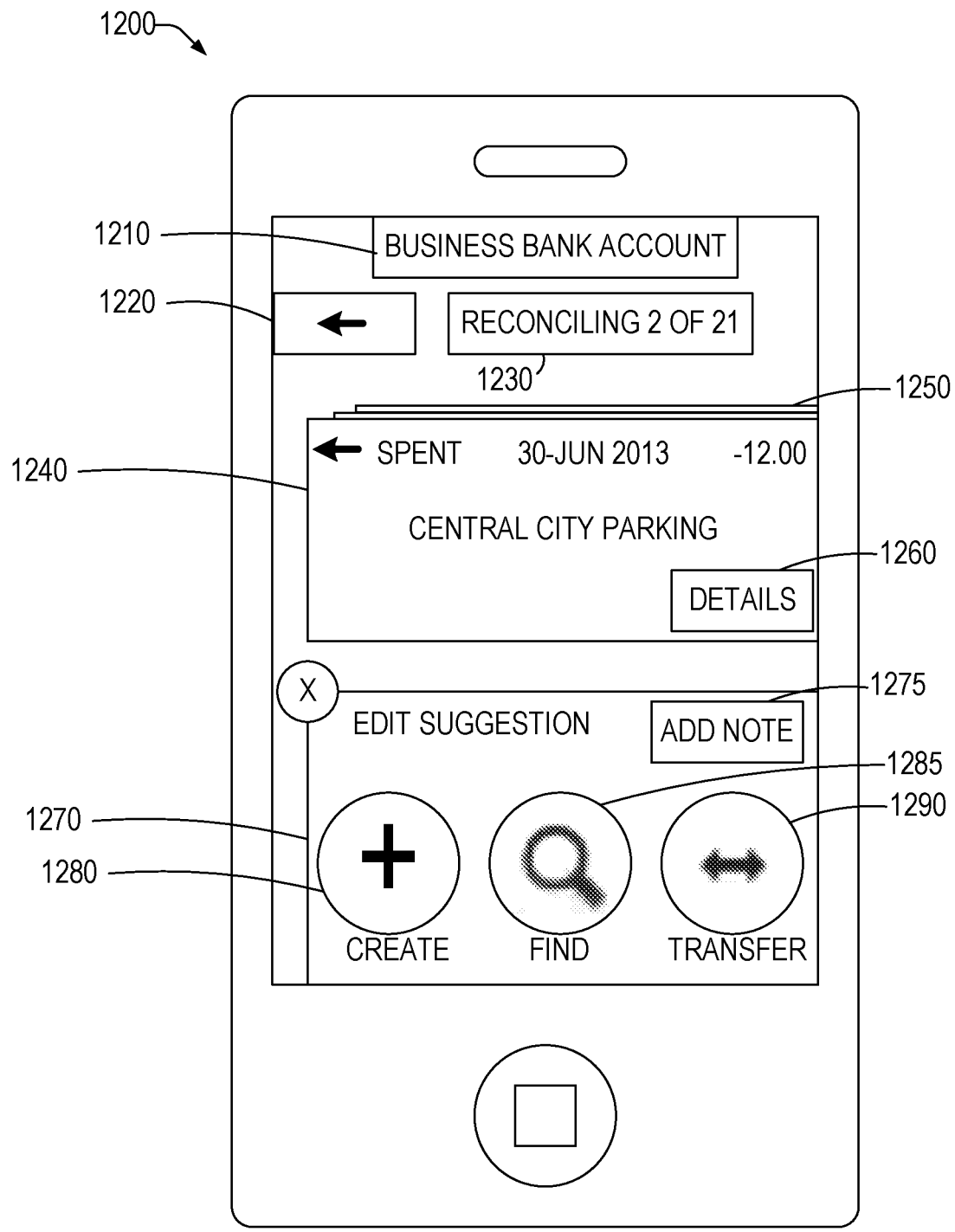

FIG. 12 is an interface diagram depicting an example user interface 1200 displaying features of a mobile banking reconciliation application. The example user interface 1200 includes title 1210, back button 1220, status 1230, objects 1240 and 1270, and additional object indicators 1250. The reference numbers 1210-1260 correspond to the reference numbers 1110-1160 described above with respect to FIG. 11. The object 1270 includes a button 1275, labeled "Add note," a button 1280, labeled "Create," a button 1285, labeled "Find," and a button 1290, labeled "Transfer."

Figure 13:
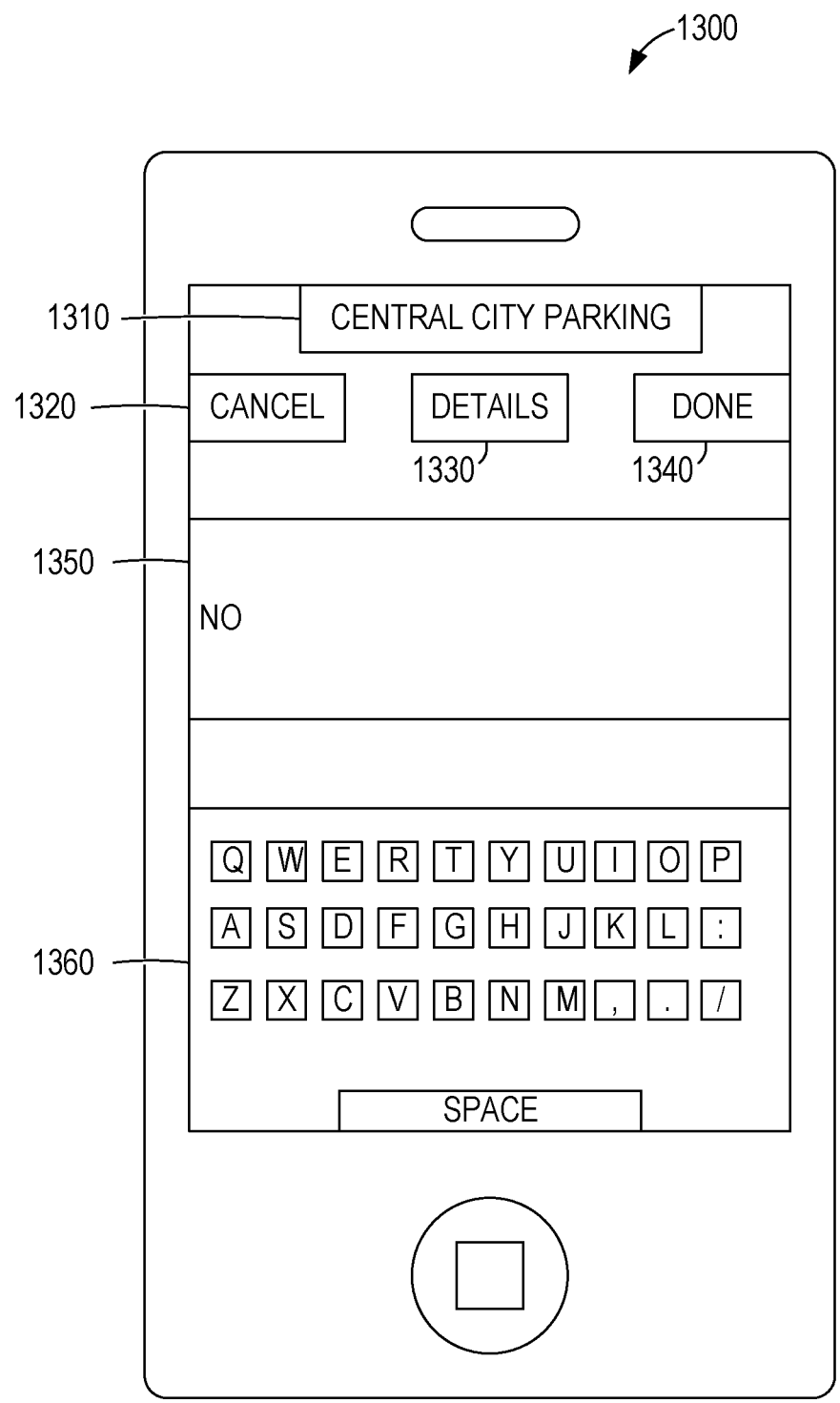

When a user activates the button 1275, the user may be presented with a user interface that allows the user to create a note associated with the suggested business record and/or banking record. FIG. 13 displays an example user interface 1300 that allows a user to create a note associated with the suggested business record and/or banking record.

When a user activates the button 1280, the user may be given the ability to create a business record that can be used to reconcile with the banking record displayed in object 1240. For example, the UI shown in FIG. 14 may be shown to the user.

Figure 16:
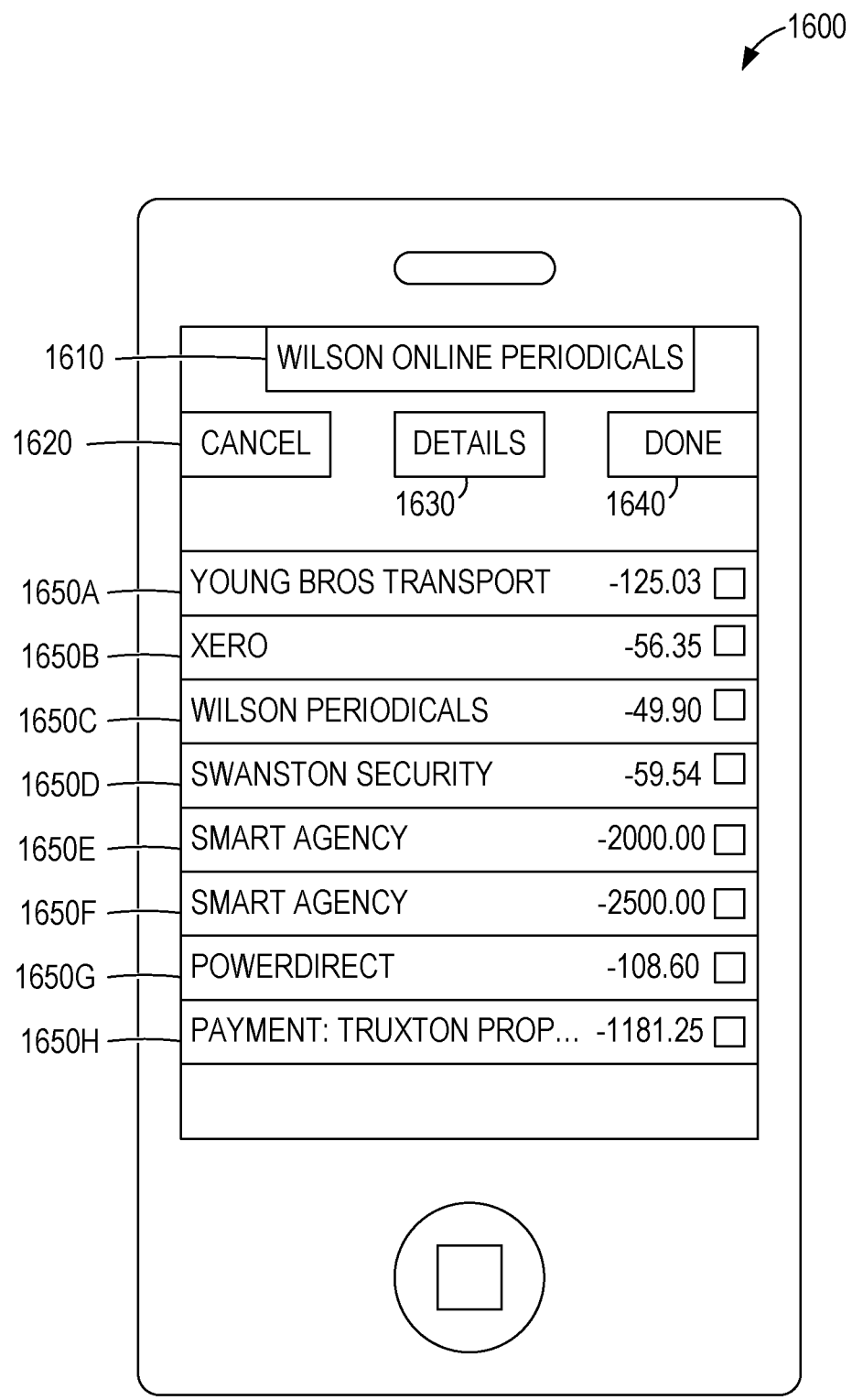

When a user activates the find button 1285, the user may be presented with a user interface displaying one or more possible business records that may be used to reconcile the banking record (e.g., using the UI shown in FIG. 16).

When a user activates the transfer button 1290, the banking record may be flagged as showing a transfer transaction. For example, a transaction showing a withdrawal from a bank account may actually be a transfer to another bank account of the same business. Accordingly, no business record is required, as there was no net change for the business.

FIG. 13 displays an example user interface 1300 that allows a user to create a note associated with the suggested business record and/or banking record. The user interface 1300 includes title 1310, buttons 1320-1340, text entry area 1350, and keyboard 1360.

The title 1310 shows the name of the entity of the record for which the note is being created. The button 1320, labeled "Cancel," is operable to cancel the entry of the note and discard any changes made. The button 1330, labeled "Details," is operable to show the details for the record to which the note is being added. The button 1340, labeled "Done," is operable to save the note and complete its association with the record. The text entry area 1350 displays the current state of the note. The keyboard 1360 is operable to edit the note.

Figure 14:
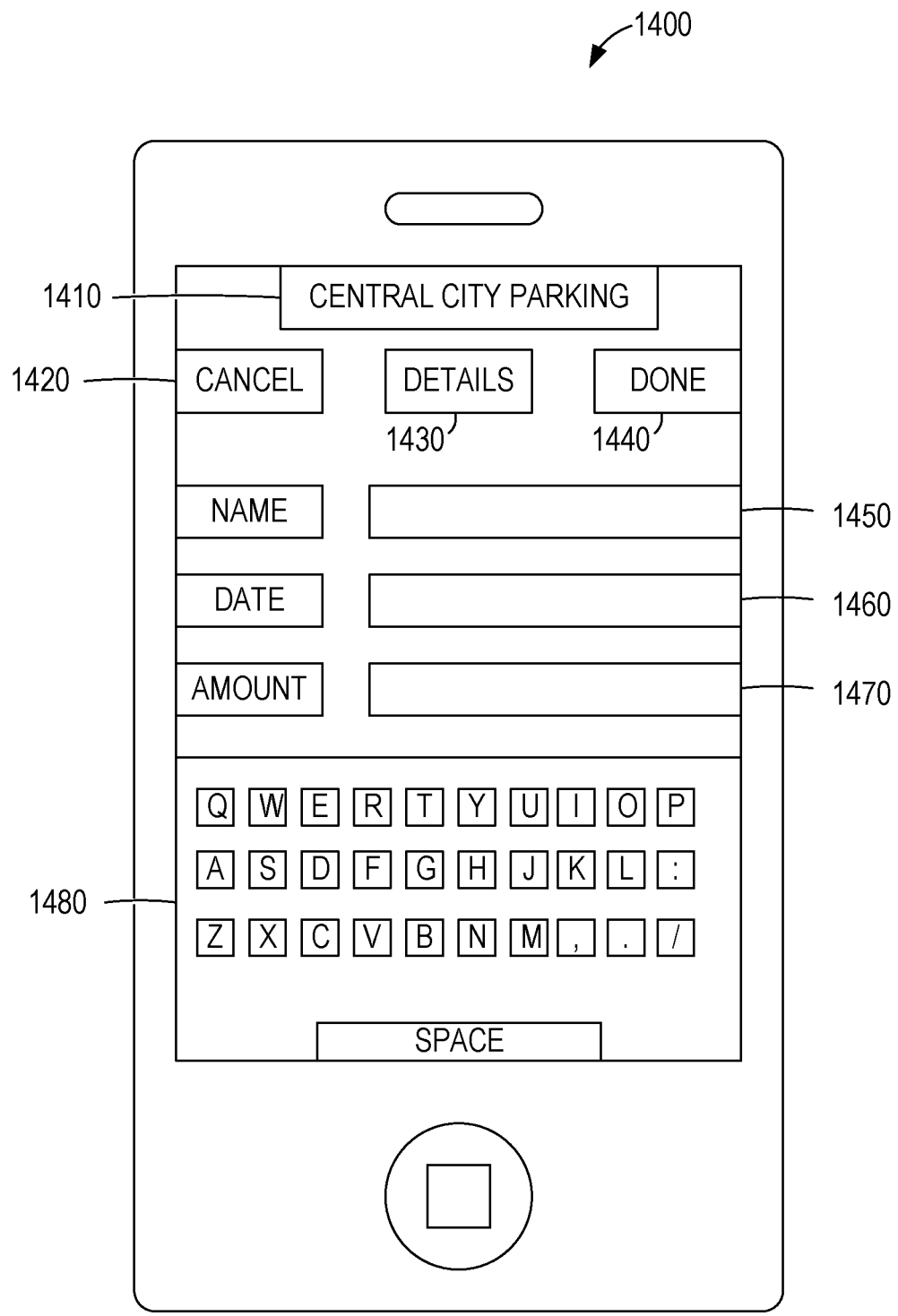

FIG. 14 displays an example user interface 1400 that allows a user to create a new business record that will be associated with the current banking record. The user interface 1400 includes title 1410, buttons 1420-1440, text entry areas 1450-1470, and keyboard 1480.

The title 1410 shows the name of the counter-party of the banking record for which the business record is being created. The button 1420, labeled "Cancel," is operable to cancel the entry of the business record and discard any changes made. The button 1430, labeled "Details," is operable to show the details for the banking record for which the business record is being created. The button 1440, labeled "Done," is operable to save the business record and complete its association with the banking record. The text entry area 1450 accepts the name of the business for the business record. The text entry area 1460 accepts the date of the business record. The text entry area 1470 accepts the amount of the business record. In some example embodiments, one or more of the text entry areas 1450-1470 is pre-populated with data based on the banking record. For example, the amount shown in the text entry area 1470 may be prepopulated with the amount of the banking record. The keyboard 1480 is operable to enter text into the text entry areas 1450-1470. In some example embodiments, different or additional fields are used.

Figure 15:
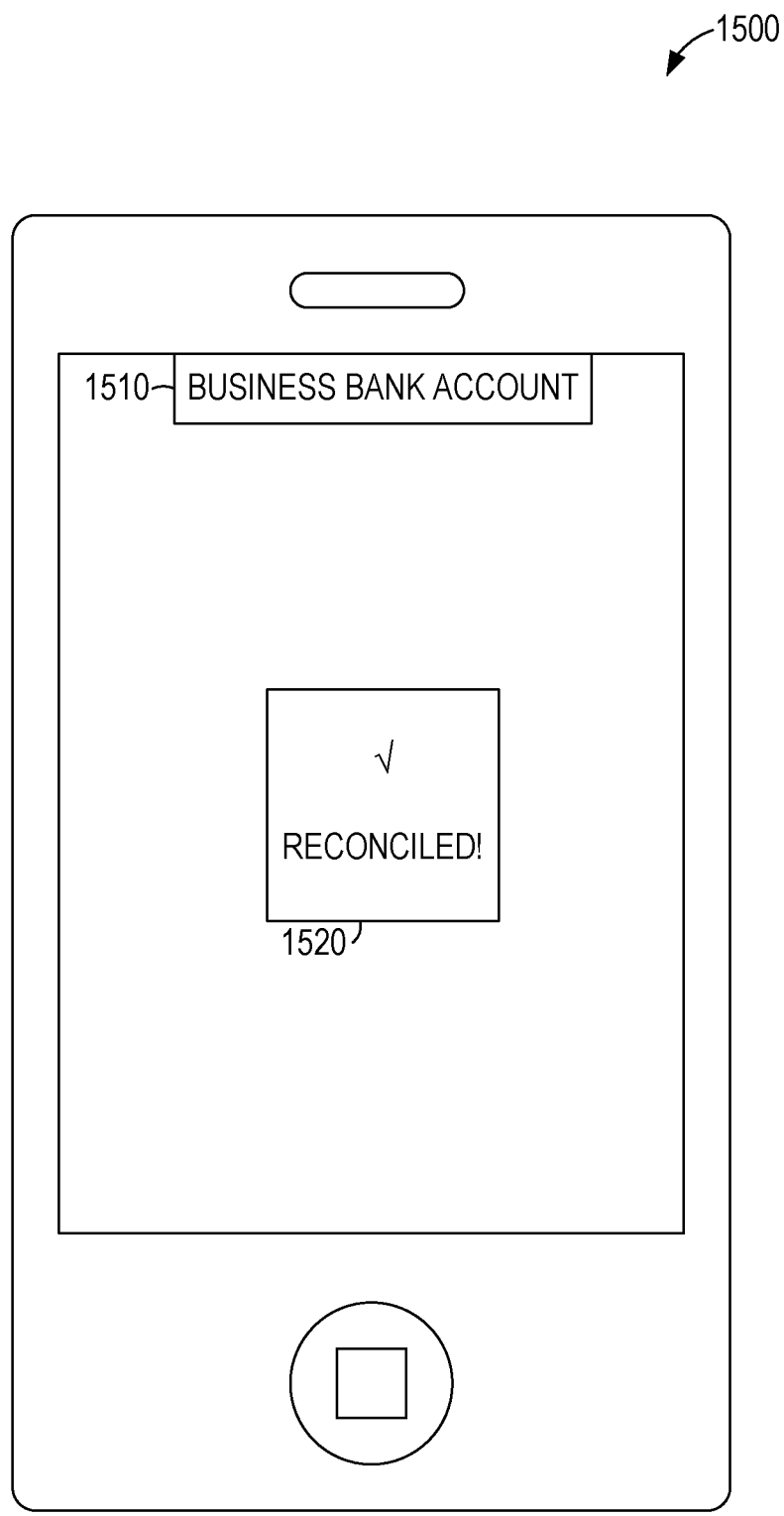

FIG. 15 shows an example user interface 1500 indicating that a bank account has been successfully reconciled. The UI 1500 may be displayed after the use of the button 1180 of FIG. 11, when the last record has been reconciled. The UI 1500 includes title 1510 and message 1520. The title 1510, "Business Bank Account," shows the name of the reconciled bank account. The message 1520 indicates that all banking records of the reconciled bank account have been reconciled with business records.

FIG. 16 displays an example user interface 1600 displaying a list of possible business records that may be used to reconcile with the banking record. The UI 1600 may be accessed by pressing the button 1285 of the UI 1200. The UI 1600 includes title 1610, buttons 1620-1640, and business records 1650a-1650h. The business records 1650a-1650h may be referred to collectively as business records 1650 or individually as a business record 1650.

The title 1610, "Wilson Online Periodicals," shows the name or payee of the transaction. The button 1620, labeled "Cancel," may be operable to cancel the search and return to the previous screen (e.g., the UI 1200). The button 1630, labeled "Details," may be operable to cause the display of details for the selected banking record (e.g., with a UI similar to that shown in FIG. 17). The button 1640, labeled "Done," may be operable to save the selected business records 1650 as matches for the banking record. The business records 1650 each include a check box. The check boxes are operable to select one or more of the business records 1650. When multiple business records 1650 are selected, the system automatically splits the bank transaction to do the match, so long as the value of the bank transaction matches the sum of the selected transactions. A user may select a particular business record 1650 to use for reconciliation with the banking record.

Figure 17:
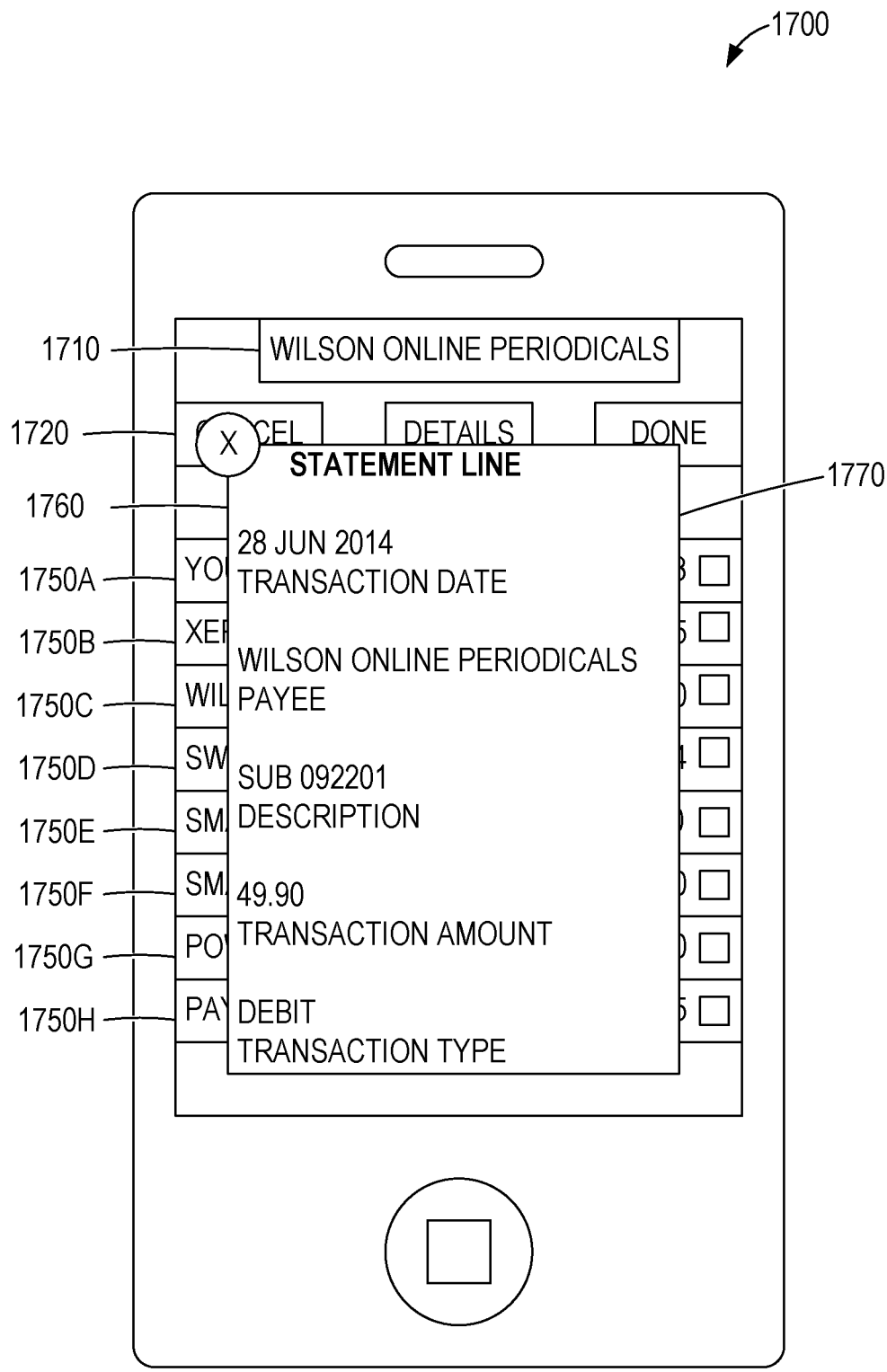

FIG. 17 displays an example user interface 1700 displaying the details of a particular business record selected from the list of possible business records. The UI 1700 may be accessed by pressing the button 1630 of the UI 1600. The UI 1700 includes title 1710, buttons 1720-1740, business records 1750a-1750h, and object 1770. The object 1770 includes the element 1760. The business records 1750a-1750h may be referred to collectively as business records 1750 or individually as a business record 1750. The title 1710, buttons 1720-1740, and business records 1750 correspond to the title 1610, buttons 1620-1640, and business records 1650, as described above with respect to FIG. 16.

The object 1770 shows details about the banking record referenced in the title 1710. As shown in FIG. 17, the banking record details include the transaction date, the party to the transaction, a description of the transaction, the amount of the transaction, and the type of the transaction. The object 1770 also includes an element 1760, marked with an "X," which may be operable to close or hide the object 1770.

As shown in FIG. 17, the details include the date of the transaction, the name of the party to the transaction, a description of the transaction, the amount of the transaction, and the type of the transaction. In example embodiments, different or additional details are shown.

Figure 18:
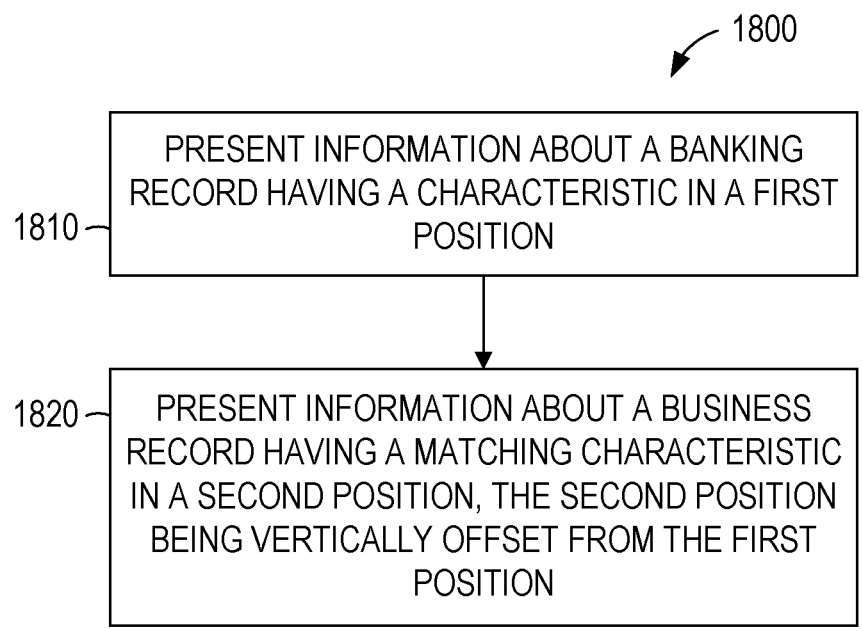
FIGS. 18-20 are flowcharts of example methods for reconciling banking transactions on a mobile device, according to some embodiments.

Below is an example library for an API for performing the operations described herein for mobile banking reconciliation, such as accessing banking records and business records, reconciling records, and the like:

SaveFastTransfer POST
  Headers
    X-Xero-SessionID—sessionID returned during login.
    X-Xero-OrganisationID—organisationID for this request.
  Parameters
    bankAccountId—string
    statementLineId—string
    transferAccountID—string
    transferAmount—number
    comments—comments
    _ts—timestamp? (seconds since epoch?)
  Response dictionary
    success—bool
    account Reconciled—BOOL indicates whether the entire bank account has now been reconciled SaveBankrulePayment POST
  Headers
    X-Xero-SessionID—sessionID returned during login.
    X-Xero-OrganisationID—organisationID for this request.
  Parameters
    bankAccountId—string
    statementLineId—string
    bankRuleID—string
    paidToName—string
    reference—string
    _ts—timestamp? (seconds since epoch?)
  Response dictionary
    success—bool
    account Reconciled—BOOL indicates whether the entire bank account has now been reconciled ReconcileDirectMatch POST
  Headers
    X-Xero-SessionID sessionID—returned during login.
    X-Xero-OrganisationID—organisationID for this request.
  Parameters
    bankAccountId—string
    statementLineId—string
    subsidiaryID—string subsidiaryTypeCode—string (SUBSTYPE/BANK)
comments—string
_ts—timestamp? (seconds since epoch?)
Response dictionary
success—bool
account Reconciled—BOOL indicates whether the entire bank account has now been reconciled SaveBankRecComment POST
Headers
X-Xero-SessionID—sessionID returned during login.
X-Xero-OrganisationID—organisationID for this request.
Parameters
statementLineId—string
comments—string
_ts—timestamp? (seconds since epoch?)
Response dictionary
success—bool GetUnreconciledTransactions GET
Headers
X-Xero-SessionID sessionID—returned during login.
X-Xero-OrganisationID—organisationID for this request.
Parameters
bankAccountId—string
statementLineId—string
nameSearch—string
amountSearch—
orderBy—
direction—
start—0
pageSize—100
showAllTransactions—BOOL
_ts—timestamp? (seconds since epoch?)
Response dictionary
success—BOOL
totalCount—count
unreconciledTransactions—array
  paidToName—string
  currencyCode—string
  isPayRunTransaction—BOOL
  transactionDate—"yyyy/mm/dd"
  reference—string
  reference2—string
  amount—number
  subsidiaryID—string
  subsidiaryType—"SUBSTYPE/ACCPAY"
  totalCount—integer
  contactName—string
  subsidiaryTypeTranslation—string
  dueDate—"yyyy/MM/dd"
  isReconciled—BOOL SaveFastPayment POST
Headers
X-Xero-SessionID—sessionID returned during login.
X-Xero-OrganisationID—organisationID for this request.
Parameters
bankAccountID—string
statementLineID—string
paidToId—string
paidToName—string
accountId—string
gstCode—string
description—string
trackingItemId1—string
trackingItemId2—string
trackingItemId3—string
trackingItemId4—string
comments—string
_ts—timestamp (seconds since epoch)
Response dictionary
account Reconciled—BOOL indicates whether the entire bank account has now been reconciled GetStatementLines GET
Headers
X-Xero-SessionID—sessionID returned during login.
X-Xero-OrganisationID—organisationID for this request.
Parameters
BankAccountId—string
status—string ("unreconciled", "all")
page—integer
start—integer
limit—integer
_ts—seconds since epoch
Response dictionary
success—bool
total—integer
results—array
  chequeNo—string
  bankRuleMatch—dictionary (null in case of matched)
  paidToName—string
  contactFieldToMatchCode—string 'MATCHFIELD/CONTACT/CONTACTID' apparently unused
  referenceFieldToMatchCode—string 'MATCHFIELD/REFERENCE/REFERENCE' again, apparently unused
  ruleName—string
  paidContactID—string
  bankRuleID—string
  reference—string
  bankRuleTemplateInvoiceID—string
  lineItemCount—integer
  payee—string
  type—string ('debit')
  reference—string
  transactionDate—string (yyyy/mm/dd)
  analysisCode—string?
  id—string
  amount—number
  memorisedTrans—dictionary
  paidToContactID—string
  rank—integer
  paidToName—string
  createdDateUTC—string (yyyy/mm/dd)
  invoiceID—string
  BTType—string (INVOICETYPE/CASHPAID)
  lineItems—array
  accountID—string
  trackingCodeID1—string
  trackingCodeID2—string
  trackingCodeID3—string
  trackingCodeID4—string
  description—string
  taxCode—string
  lineItemCount—integer
  bankAccountID—string
  notes—string
  matchedTrans—array (null in case of rule match)
  paidToName—string
  currencyCode—string
  isPayRunTransaction—bool
  transactionDate—string (yyyy/mm/dd)
  reference—string
  reference2—string
  amount—number
  subsidiaryId string subsidiaryType—string (SUBSTYPE/BANK)
totalCount—integer
contactName—string
subsidiaryTypeTranslation—string
dueDate—string (yyyy/mm/dd)
isReconciled—bool
isReconciled—BOOL
comments—string FIG. 18 is a flowchart of an example method 1800 for reconciling banking transactions on a mobile device. The method 1800 includes operations 1810 and 1820, which present information about a banking record and a business record, respectively. The operations in the method 1800 may be performed by a mobile device using modules such as those shown in FIG. 5.

In operation 1810, information about a banking record is presented by the display module 520. The banking record has a characteristic. A characteristic is any specific detail about the banking record. For example, the banking record may represent a transaction that occurred on a certain date, with a certain party, for a certain amount, and so on. The information about the banking record is presented in a first position on a display. For example, the information about the banking record may be displayed on a card. The card may be positioned in the top half of the display of a mobile device. As another example, the information about the banking record may be displayed in a row of a table. The position of the information may be defined by the row number, the (x,y) pixel coordinates of a corner of the row, or in another way.

In operation 1820, information about a business record is presented by the display module 520. The business record has a characteristic that matches the characteristic of the banking record. For example, the business record may represent a transaction that occurred on the same date as the banking record, was with the same party as the banking record, was for the same amount as the banking record, and so on. In some example embodiments, the business record has multiple matching characteristics selected from a set of considered characteristics. For example, date, party, and amount may be considered characteristics, and the business record may be selected based on at least two of the considered characteristics matching. The information about the business record is presented in a second position on the display. For example, the information about the business record may be displayed on a card. The card may be positioned in the bottom half of the display of a mobile device. As another example, the information about the business record may be displayed in a row of a table. The position of the information may be defined by the row number, the (x,y) pixel coordinates of a corner of the row, or in another way.

Figure 19:
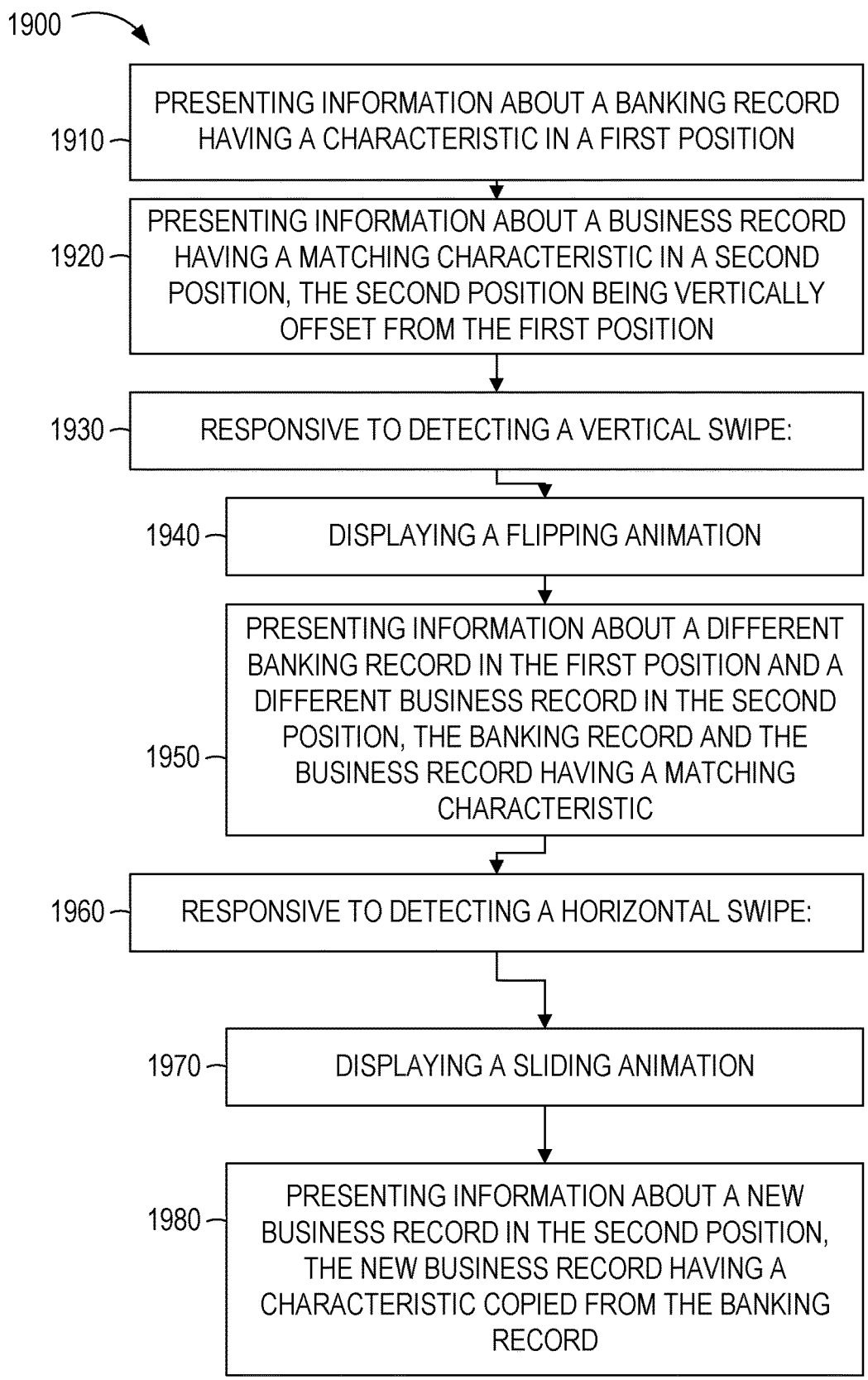

FIG. 19 is a flowchart of an example method 1900 for reconciling banking transactions on a mobile device. The method 1900 includes operations 1910-1980. The operations in the method 1900 may be performed by a mobile device using modules such as those shown in FIG. 5.

In operation 1910, information about a banking record is presented. The operation 1910 may be performed in the same manner as the operation 1810, described above with respect to FIG. 18.

In operation 1920, information about a business record is presented. The operation 1920 may be performed in the same manner as the operation 1820, described above with respect to FIG. 18.

In operation 1930, a vertical swipe is detected by the input module 530. For example, a vertical swipe may be detected on the touch screen of a mobile device. Responsive to the detection of the vertical swipe, the operations 1940 and 1950 are performed.

In operation 1940, a flipping animation is displayed by the display module 520. For example, the information about the business record displayed in operation 1920 may have been displayed on a card. The flipping animation may show the card flipping down and off of the display, allowing a card that was previously hidden to be displayed. In some example embodiments, a sliding animation is used, showing the new banking record and recommended business record sliding into place from the top or bottom of the screen, based on the direction of the vertical swipe detected in operation 1930.

In operation 1950, information about a different business record is displayed by the display module 520 in the same position as the information displayed in operation 1920. Also, information about a different banking record is displayed by the display module 520 in the same position as the information displayed in operation 1910. For example, after the first banking record/business record pair has flipped off of the display, a second banking record/business record pair may be displayed on card in the same positions. The second banking record/business record pair may be selected for display based on the direction, length, and velocity of the vertical swipe. For example, a downward swipe may cause a later record pair to be displayed and an upward swipe may cause an earlier record pair to be displayed. The banking record and the business record may be paired based on one or more matching characteristics.

In operation 1960, a horizontal swipe is detected by the input module 530. For example, a horizontal swipe may be detected on the touch screen of the mobile device. Responsive to the detection of the horizontal swipe, the operations 1970 and 1980 are performed.

In operation 1970, a sliding animation is displayed by the display module 520. For example, the information about the business record displayed in operation 1920 may have been displayed on a card. The sliding animation may show the card sliding to one side off of the display.

In operation 1980, information about a new business record is displayed by the display module 520 in the same position as the business record that was slid off of the display. For example, the information about the new business record may have slid onto the display at the same time that the old business record was slid off. The new business record has one or more characteristics copied from the banking record. For example, the amount of the new business record may be copied from the banking record. In some example embodiments, a horizontal swipe in the opposite direction of the swipe detected in operation 1940 operates to restore the view of the old business card.

In some example embodiments, the horizontal swipe causes the display of an additional matching business record instead of a new business record. For example, a banking record may have three business records that are potential matches based on the characteristics of the banking record and each of the three business records. Accordingly, in operation 1920, a first one of the three business records is presented. After detection of a first horizontal swipe, a second one of the three business records is presented. After detection of a second horizontal swipe, a third one of the three business records is presented. After detection of a third horizontal swipe, a new business record is presented, as described above with respect to operation 1980.

Thus, by the use of the method 1900, a UI is presented that allows a user to flip between existing banking record/ business record pairs by using vertical swipes and to see alternative pairings and proposed new business records using horizontal swipes.

Figure 20:
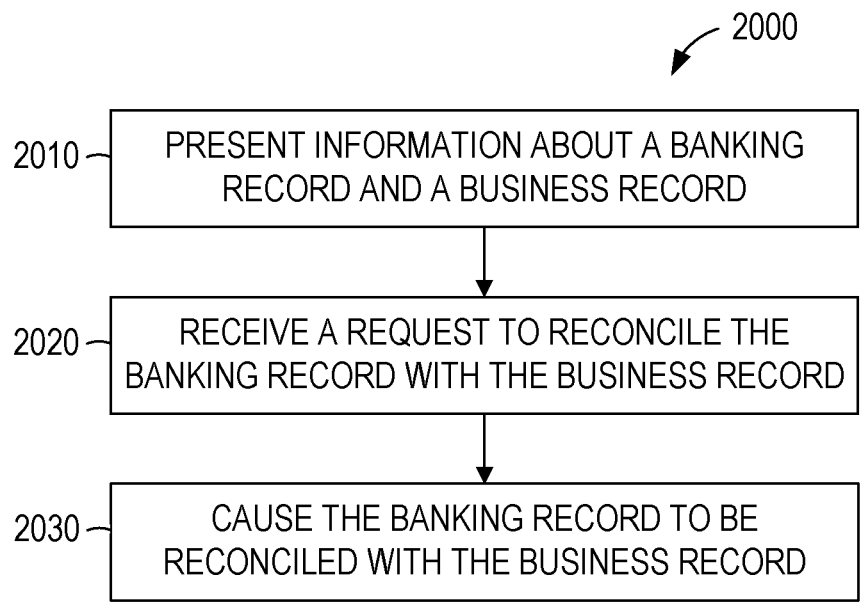

FIG. 20 is a flowchart of an example method 2000 for reconciling banking transactions on a mobile device. The method 2000 includes operations 2010-2030. The operations in the method 2000 may be performed by a mobile device using modules such as those shown in FIG. 5.

In operation 2010, information about both a banking record and a business record is presented by the display module 520. For example, the method 1800 or the method 1900 may be used to display the banking record and business record information.

In operation 2020, a request to reconcile the banking record with the business record is received by the input module 530. For example, if multiple business records are presented along with a single banking record, touching or clicking on the business record may indicate a request to reconcile the banking record with the selected business record. As another example, if the business record is presented on a card along with an OK button, pressing the OK button may create a request to reconcile the banking record with the business record.

In operation 2030, the banking record is caused to be reconciled with the business record by the reconciliation module 540. For example, if the request was generated by a user of a mobile device, the mobile device may communicate with a server having a database containing the business and banking records. The server may update the database to reflect the reconciliation of the two records.

Certain embodiments are described herein as including logic or a number of components, modules, or mechanisms. Modules may constitute hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 21:
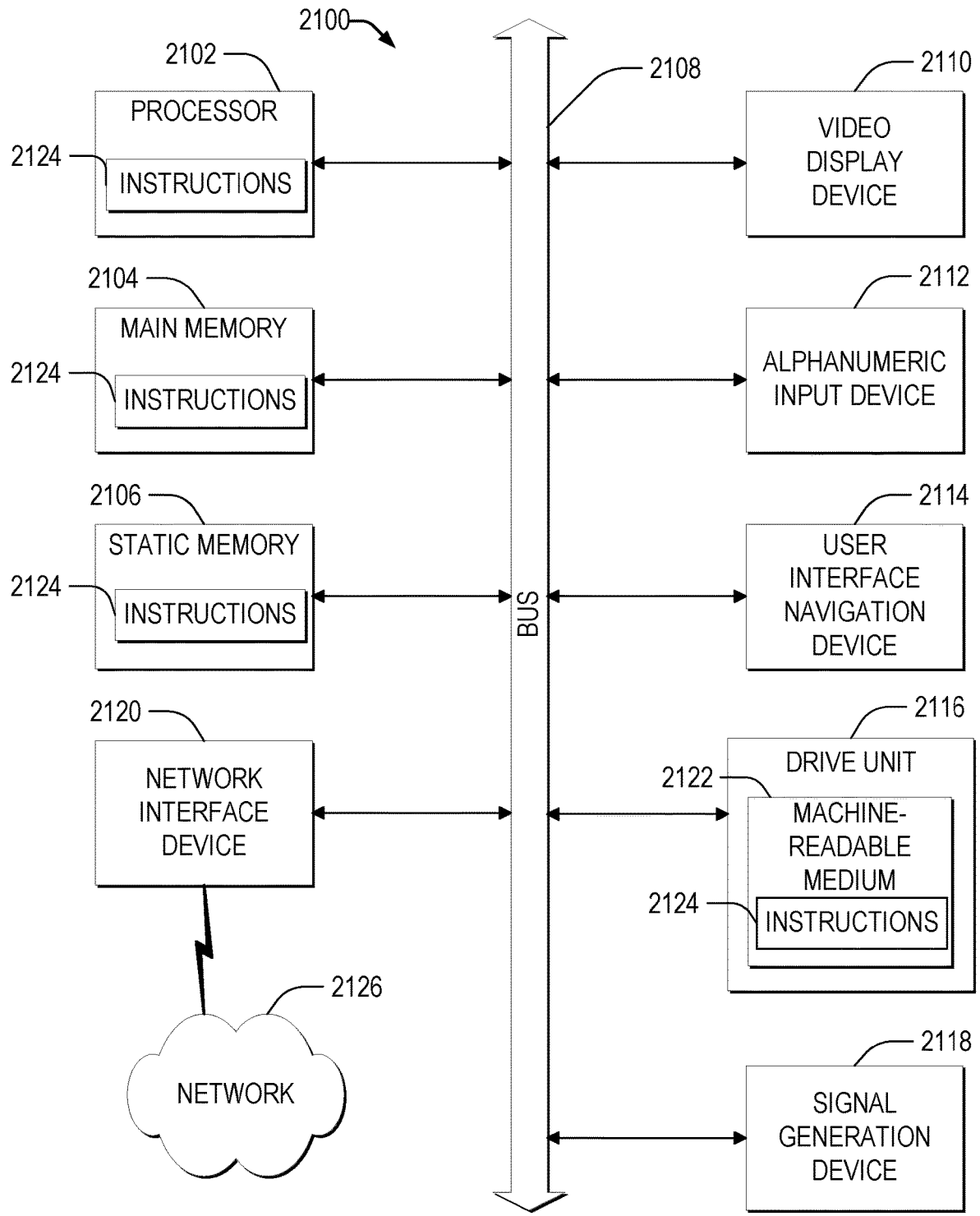
FIG. 21 is a block diagram of a machine in the example form of a computer system within which a set of instructions, for causing the machine to perform any one or more of the methodologies discussed herein, may be executed, according to some embodiments.

FIG. 21 is a block diagram of a machine in the example form of a computer system 2100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 2100 includes a processor 2102 (e.g., a central processing unit (CPU), a graphics processing unit (GPU), or both), a main memory 2104, and a static memory 2106, which communicate with each other via a bus 2108. Computer system 2100 may further include a video display device 2110 (e.g., a liquid crystal display (LCD) or a cathode ray tube (CRT)). Computer system 2100 also includes an alphanumeric input device 2112 (e.g., a discrete keyboard or keyboard implemented using a touch screen of the video display device 2110), a user interface navigation device 2114 (e.g., a mouse or touch sensitive display), a disk drive unit 2116, a signal generation device 2118 (e.g., a speaker), and a network interface device 2120.

Disk drive unit 2116 includes a machine-readable medium 2122 on which is stored one or more sets of instructions and data structures (e.g., software) 2124 embodying or utilized by any one or more of the methodologies or functions described herein. Instructions 2124 may also reside, completely or at least partially, within main memory 2104, within static memory 2106, and/or within processor 2102 during execution thereof by computer system 2100, main memory 2104 and processor 2102 also constituting machine-readable media.

While machine-readable medium 2122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 2124 may further be transmitted or received over a communications network 2126 using a transmission medium. Instructions 2124 may be transmitted using network interface device 2120 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   presenting, on a display device, a first object including information from a banking record having a characteristic, the first object being presented in a first position;
   determining, by a processor, that a business record has a characteristic that is the same as the characteristic of the banking record;
   presenting, on the display device and based on the determination, a second object including information from the business record, the second object being presented in a second position, the second position being vertically offset from the first position;
   presenting, on the display device, a user interface element operable to associate the banking record presented in the first object with the business record presented in the second object;
   providing an option to receive a directional input via the user interface element, the directional input being one of a horizontal swipe or a vertical swipe, the user interface presenting alternative pairings and proposed new business records in response to a horizontal swipe, the user interface flipping between banking record and business record pairs in response to a vertical swipe;
   responsive to the directional input comprising a horizontal swipe, modifying the information of the second object to hide the information of the business record and show information of a different business record from the proposed new business records; and
   responsive to the directional input comprising a vertical swipe, displaying information about a different banking record on the display device in the same position as the banking information of the first object and displaying information about a different business record on the display device in the same position as the business information of the second object.

2. The method of claim 1, further comprising:
   detecting an operation of the user interface element; and
   causing an association of the business record with the banking record.

3. The method of claim 1, further comprising:
   accessing a plurality of business records, the business record being included in the plurality of business records.

4. The method of claim 1, wherein the first position is above the second position.

5. The method of claim 1, wherein the user interface element is included within the second object.

6. The method of claim 1, wherein a color of the user interface element of the second object indicates that the business record was detected as a possible match.

7. The method of claim 1, wherein responsive to the directional input, a flipping animation is shown.

8. The method of claim 1, wherein responsive to the directional input, a sliding animation is shown.

9. The method of claim 1, wherein a color of the user interface element of the second object indicates that the different business record was not detected as a possible match.

10. The method of claim 1, wherein the different business record is a new business record.

11. The method of claim 10, wherein the new business record has a characteristic and the characteristic is copied from the banking record.

12. The method of claim 10, wherein a color of the user interface element of the second object indicates that the different business record is a new business record.

13. A system comprising:
   a display device; and
   one or more modules configured to:
      present, on the display device, a first object including information from a banking record having a characteristic, the first object being presented in a first position;
      determine that a business record has a characteristic that is the same as the characteristic of the banking record;
      present, on the display device, a second object including information from the business record, the second object being presented in a second position, the second position being vertically offset from the first position;
      present, on the display device, a user interface element operable to associate the banking record presented in the first object with the business record presented in the second object;
      provide an option to receive a directional input via the user interface element, the directional input being one of a horizontal swipe or a vertical swipe, the user interface presenting alternative pairings and proposed new business records in response to a horizontal swipe, the user interface flipping between banking record and business record pairs in response to a vertical swipe;
      responsive to the directional input comprising a horizontal swipe, modify the information of the second object to hide the information of the business record and show information of a different business record from the proposed new business records; and
      responsive to the directional input comprising a vertical swipe, displaying information about a different banking record on the display device in the same position as the banking information of the first object and displaying information about a different business record on the display device in the same position as the business information of the second object.

14. The system of claim 13, wherein the one or more modules are further configured to:
   detect an operation of the user interface element; and
   cause an association of the business record with the banking record.

15. The system of claim 13, wherein the one or more modules are further configured to:
   access a plurality of business records, the business record being included in the plurality of business records.

16. The system of claim 13, wherein the first position is above the second position.

17. A non-transitory machine-readable storage medium storing instructions which, when executed by one or more processors, cause the one or more processors to perform operations comprising:

presenting, on a display device, a first object including information from a banking record having a characteristic, the first object being presented in a first position;

determining that a business record has a characteristic that is the same as the characteristic of the banking record;

presenting, on the display device, a second object including information from the business record, the second object being presented in a second position, the second position being vertically offset from the first position;

presenting, on the display device, a user interface element operable to associate the banking record presented in the first object with the business record presented in the second object;

providing an option to receive a directional input via the user interface element, the directional input being one of a horizontal swipe or a vertical swipe, the user interface presenting alternative pairings and proposed new business records in response to a horizontal swipe, the user interface flipping between banking record and business record pairs in response to a vertical swipe;

responsive to the directional input comprising a horizontal swipe, modifying the information of the second object to hide the information of the business record and show information of a different business record from the proposed new alternative business records; and responsive to the directional input comprising a vertical swipe, displaying information about a different banking record on the display device in the same position as the banking information of the first object and displaying information about a different business record on the display device in the same position as the business information of the second object.

* * * * *